Dec. 24, 1940. J. B. HAWLEY, JR., ET AL 2,225,631
HYDRAULIC MACHINE FOR MOLDING GLASS ARTICLES
Filed Jan. 14, 1937 15 Sheets-Sheet 4

John B. Hawley, Jr.
Irving Nelson
Don Hallberg
Earl Cannon
INVENTORS

BY J. F. Rule,
ATTORNEY

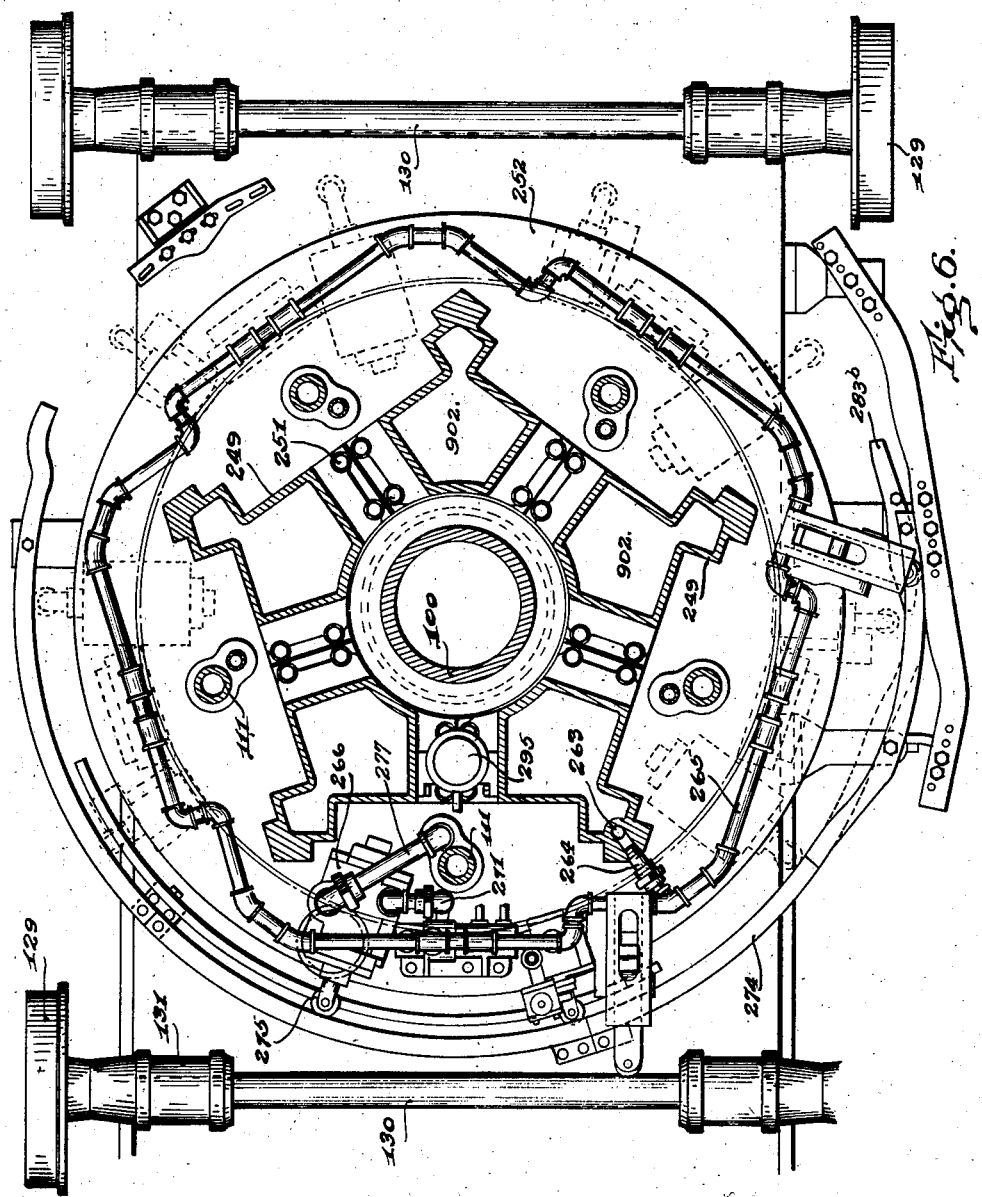

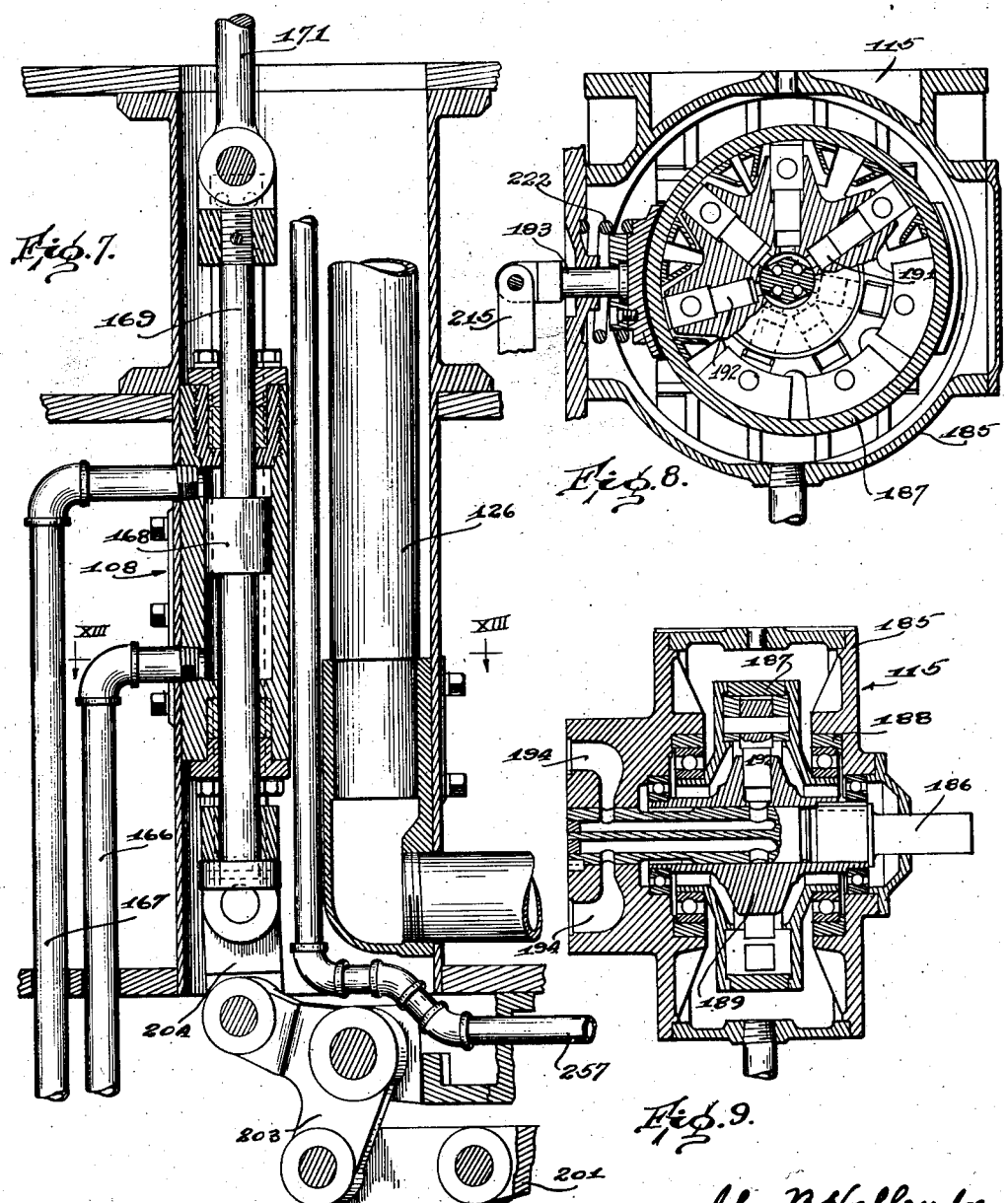

Dec. 24, 1940.  J. B. HAWLEY, JR., ET AL  2,225,631
HYDRAULIC MACHINE FOR MOLDING GLASS ARTICLES
Filed Jan. 14, 1937   15 Sheets-Sheet 7
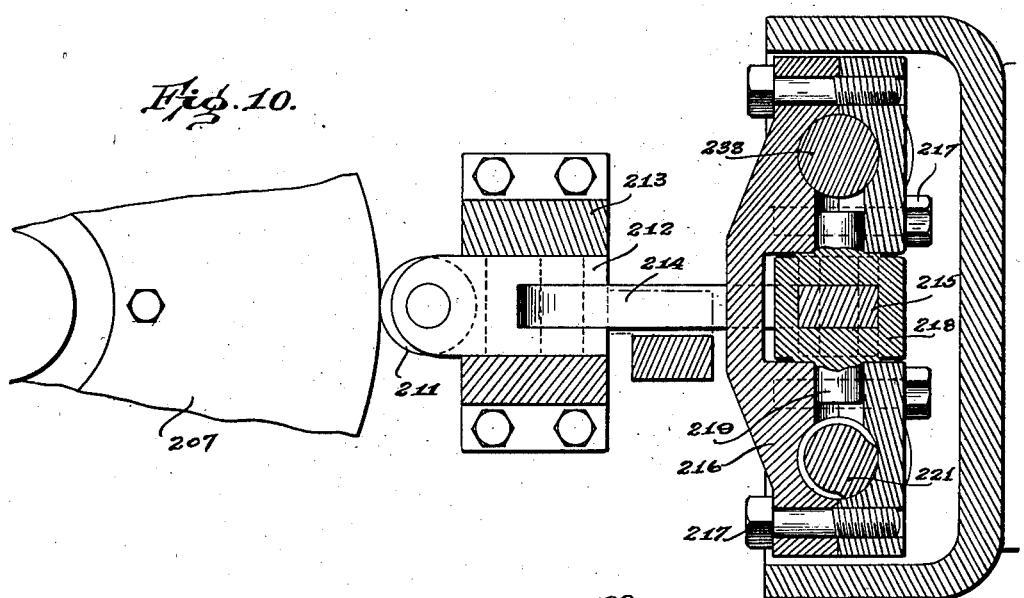
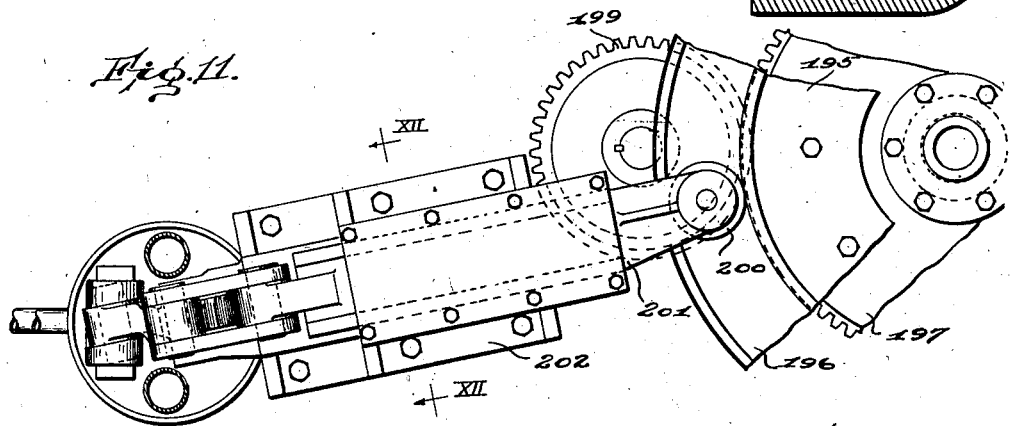
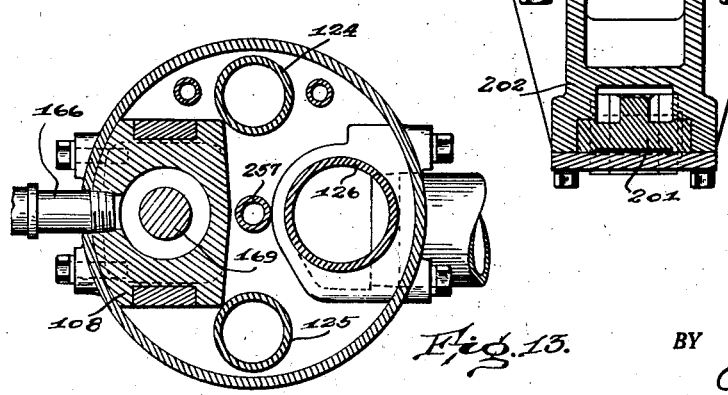

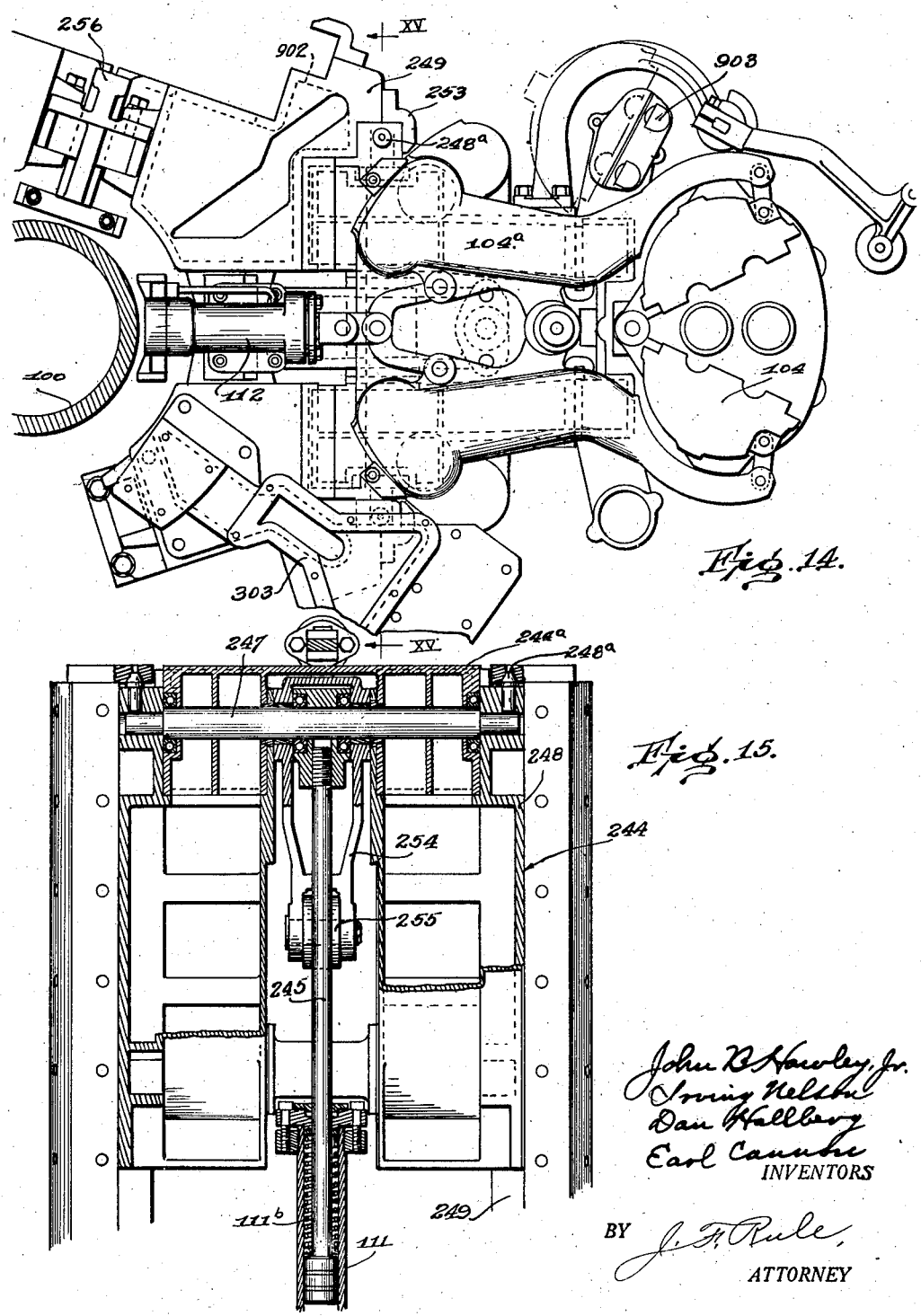

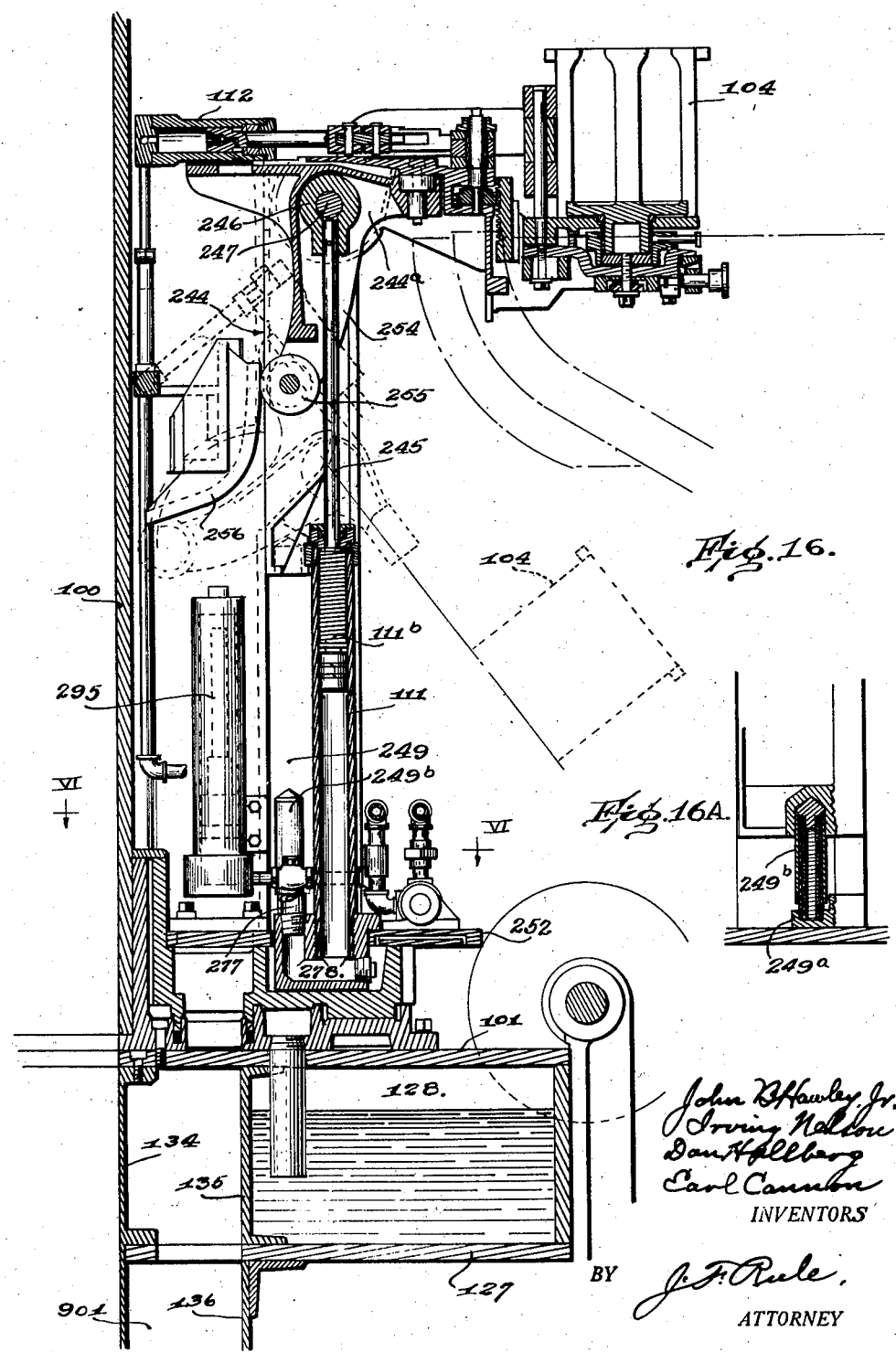

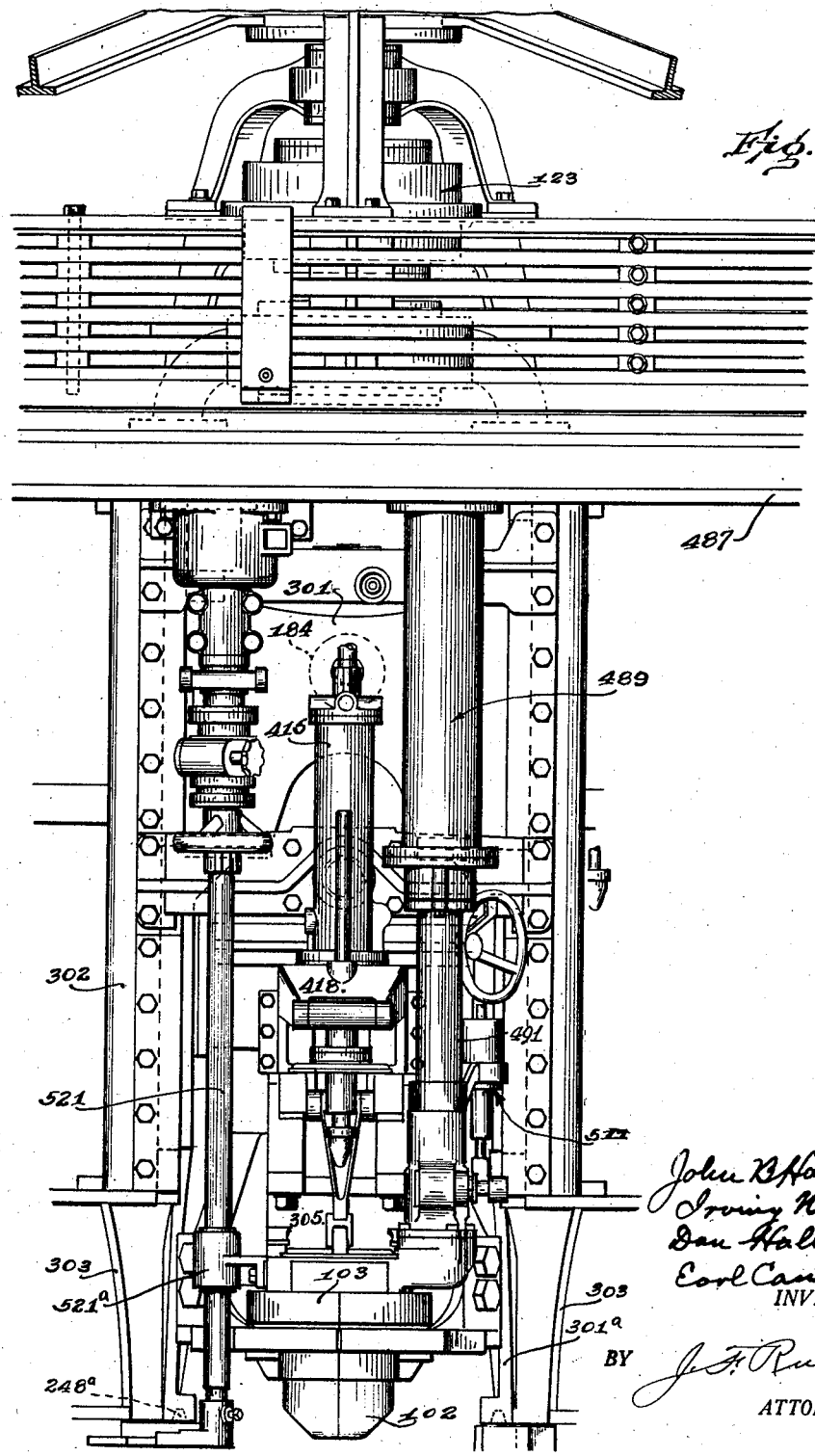

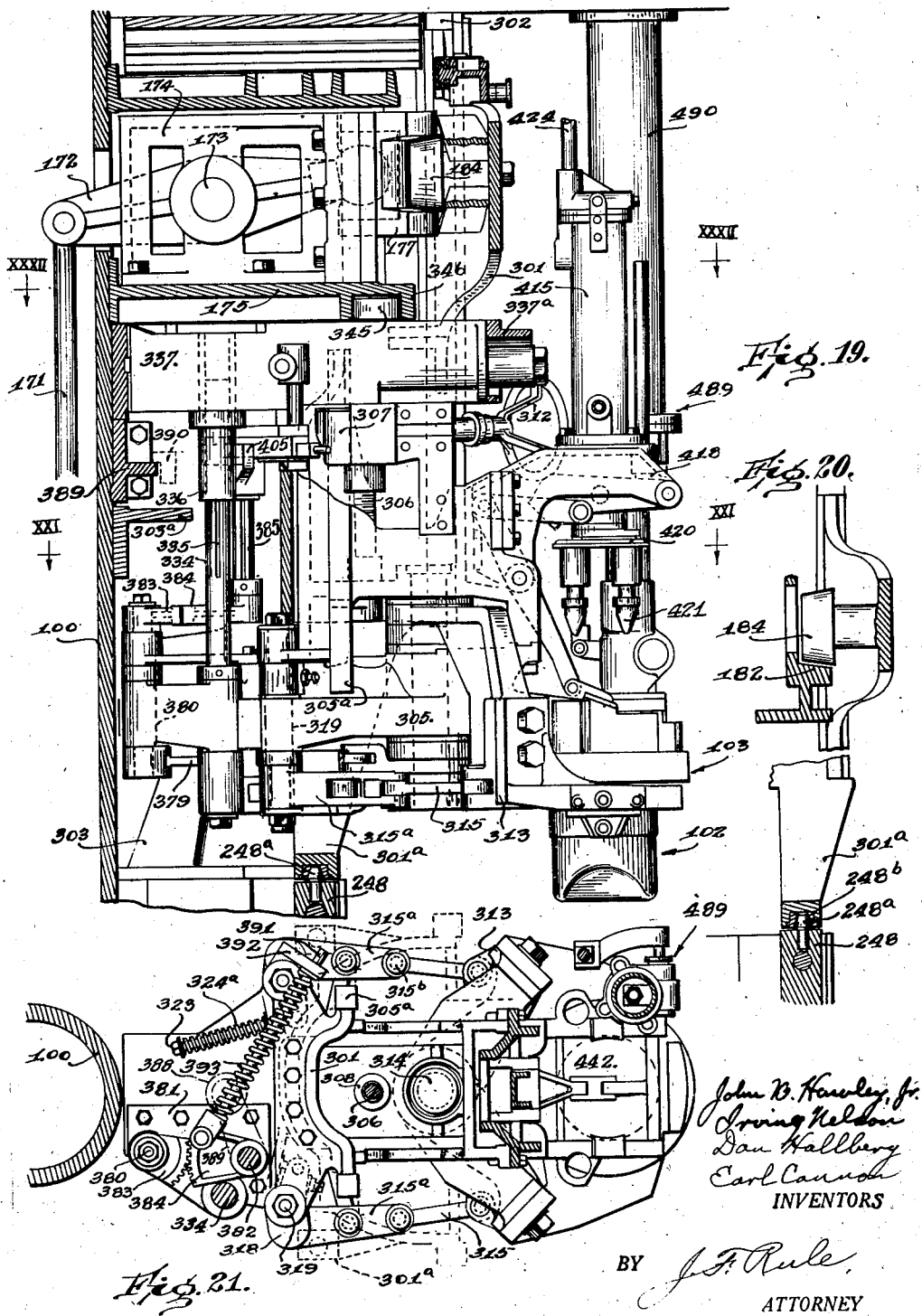

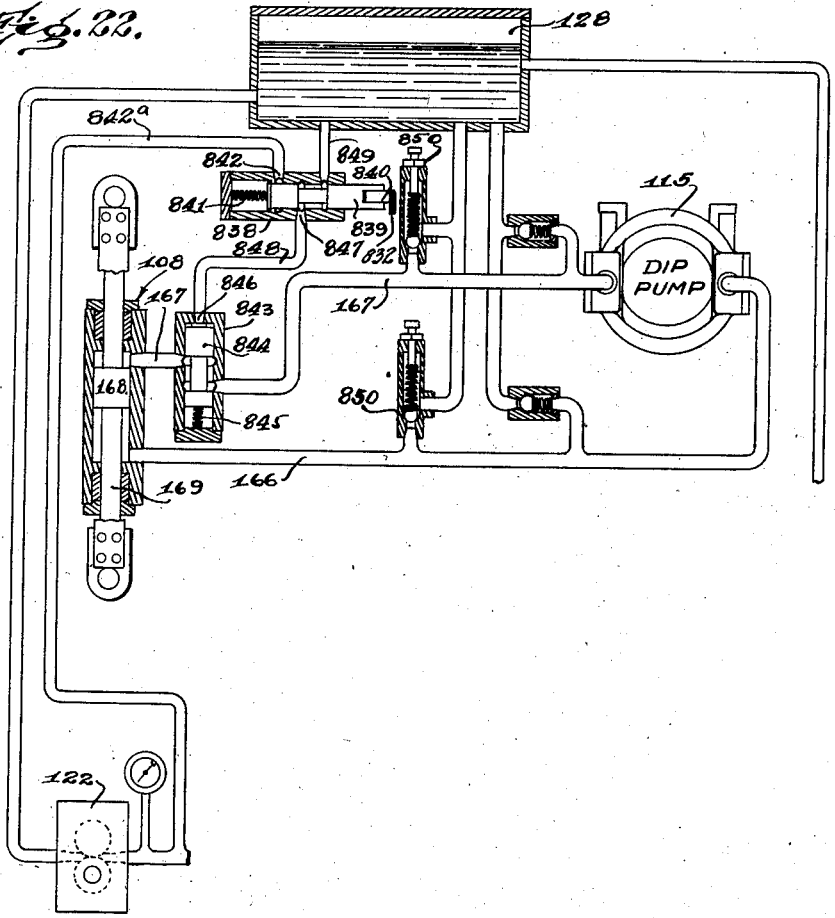

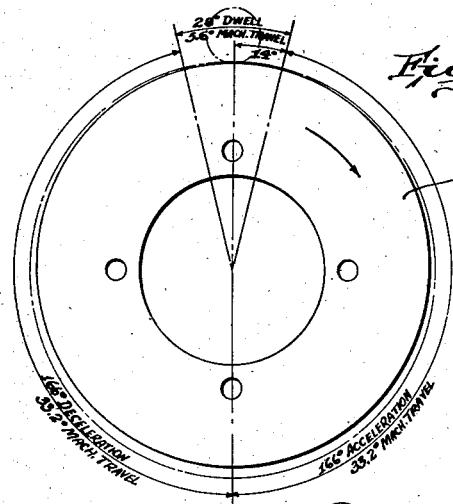
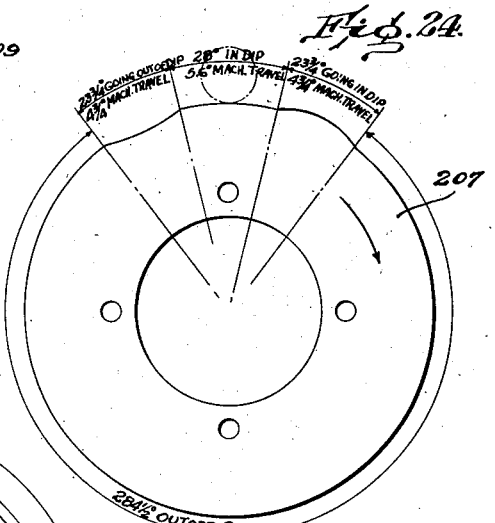
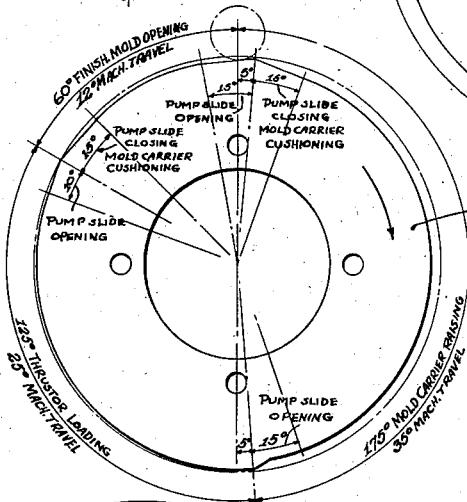
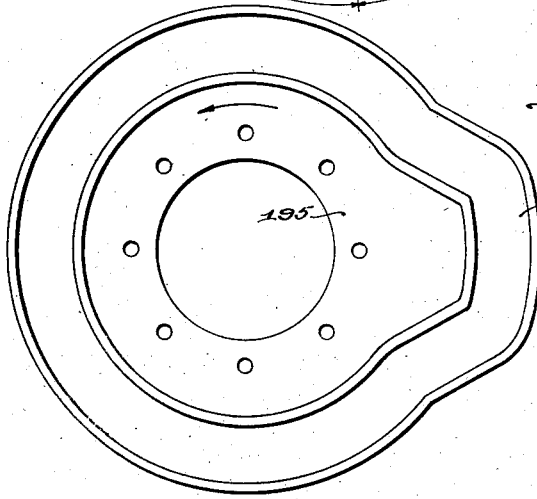

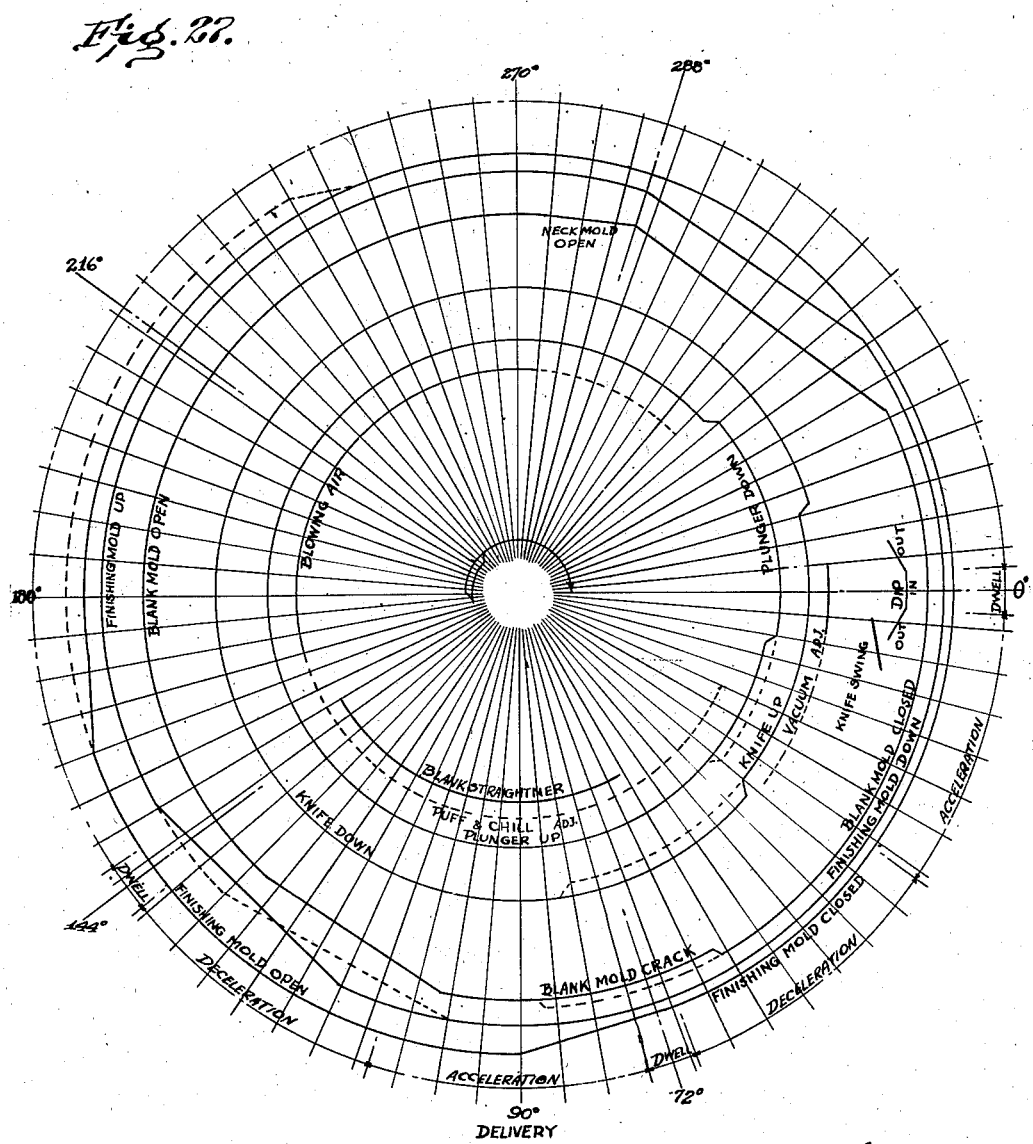

Patented Dec. 24, 1940

2,225,631

UNITED STATES PATENT OFFICE 2,225,631

HYDRAULIC MACHINE FOR MOLDING GLASS ARTICLES

John B. Hawley, Jr., Irving Nelson, and Daniel F. Hallberg, Minneapolis, Minn., and Earl Cannon, Rockville Centre, N. Y., assignors to Owens-Illinois Glass Company, a corporation of Ohio Application January 14, 1937, Serial No. 120,622

18 Claims. (Cl. 49—5)

Our invention relates to machines for molding hollow glass articles including bottles, jars and various other kinds of hollow ware. The invention includes machines of the suction gathering type, as, for example, automatic machines of the Owens type. Such a machine includes a horizontally rotating mold carriage on which are mounted dip heads or units, each carrying a suction gathering mold or molds. The dip heads are brought periodically and in succession over a pool or supply body of molten glass. The head is then lowered and the mold thereby brought into dip to receive a charge of glass by suction and form a parison which is thereafter transferred to a finishing mold in which it is blown to the form of the finished article. The invention in its preferred form embodies a hydraulically operated machine in which the mold carriage is driven by hydraulic power and the major operations effected and controlled by hydraulic mechanism.

In automatic machines now in general use for the manufacture of bottles, jars, etc., many different individual movements or operations are involved in the process of forming a complete article, including the rotation of the mold carriage, the individual movements of the dip heads and gathering molds during the charge gathering operations, the opening and closing movements of the molds, the application of suction and air pressure for gathering and forming the blanks, the transfer movements by which the parisons are transferred to the finishing molds, and various other movements and operations. All of these movements must be coordinated and effected in the proper order of sequence.

In the production of high grade ware it is necessary to provide adjusting means for adjustably regulating the time of initiation and length of duration of different operations as required by changes in temperature and other variable conditions met with in practice. Adjustments must also be made to adapt the various operations to the size, shape, wall thickness and other characteristics of the particular ware which is being produced.

An object of our invention is to provide a practical machine embodying adjustment features to meet the above noted requirements, and which has great flexibility and ease of adjustment, adapting it for use in the manufacture of articles which vary widely in shape, size and other properties.

Another object of the invention is to provide an improved machine of the type comprising a rotary mold carriage on which are mounted a plurality of individual heads or units, which improved machine is compactly built and of smaller size and mold radius than machines of this type now in general use, and, moreover, to provide such a machine which is adapted to make bottles of other articles of various sizes, shapes and capacities, each head operating to make articles of a particular design independently of the size, shape or other characteristics of the articles being made at the same time on the other heads of the machine. In the attainment of this object, we provide a machine driven and controlled by hydraulic power mechanism which is particularly adapted to provide a wide range and flexibility of adjustment of the timing, extent and duration of the various movements or operations, and synchronization of the operations individual to each head or unit with those of the other units of the machine.

A further object of the invention is to provide a machine in which separate power devices or motors are provided for effecting the major operations, combined with means for synchronizing such operations, and hand operated mechanism for adjusting the speed of the machine as a whole while maintaining synchronization of the different operations. More specifically, the invention provides hydraulic means or motors for the major driving operations combined with adjustment devices by which is obtained the flexibility of adjustment and control permitted by the use of such hydraulic means.

A novel feature of our invention consists in the provision, in a machine of the suction gathering type including a rotating mold carriage and a series of mold carrying heads or units thereon, of novel means for periodically accelerating and decelerating the movement of the mold carriage to permit a slow movement of the carriage during each charge gathering operation and a relatively rapid movement between charge gathering operations. In this manner, the gathering molds while in dip or in contact with the supply body of glass from which they draw their charge by suction, are given a relatively slow movement during the gather. This results in a material reduction in the time required to fill the mold, and insures a good seal between the mouth of the slowly moving mold and the pool or supply body of glass. Our invention, by providing for a slow movement of the molds during the gathering operation, enables such operation to be effected while the mold travels through a comparatively short distance over the supply body and thereby permits a corresponding reduction in the exposed gathering area. This in turn reduces the amount of chilling at the gathering area and permits proper temperature conditions of the glass entering the molds.

Our invention, by providing hydraulic means for accelerating and decelerating the speed of the mold in the manner above noted, permits such changes in the speed to be made smoothly and rapidly with much less strain on the mechanism than occurs with other mechanisms used for changing the speed of the mold carriage and, moreover, permits the use of greatly simplified mechanism.

A further feature of our invention consists in providing in connection with the hydraulic means for changing the speed of the mold carriage, adjusting means by which the speed may be adjustably varied to any degree that may be desired.

A further feature of the invention consists in driving the machine by hydraulic mechanism which in turn is driven with constant speed electric motors. The electric motors can be controlled either selectively or as a group.

Other objects of our invention will appear hereinafter in the following more detailed description of our invention.

Referring to the accompanying drawings:

Fig. 3A is a section at the line IIIA—IIIA on Fig. 3;

Fig. 6 is a sectional plan view of the machine, the section being taken at the line VI—VI on Fig. 16;

Figure 3:
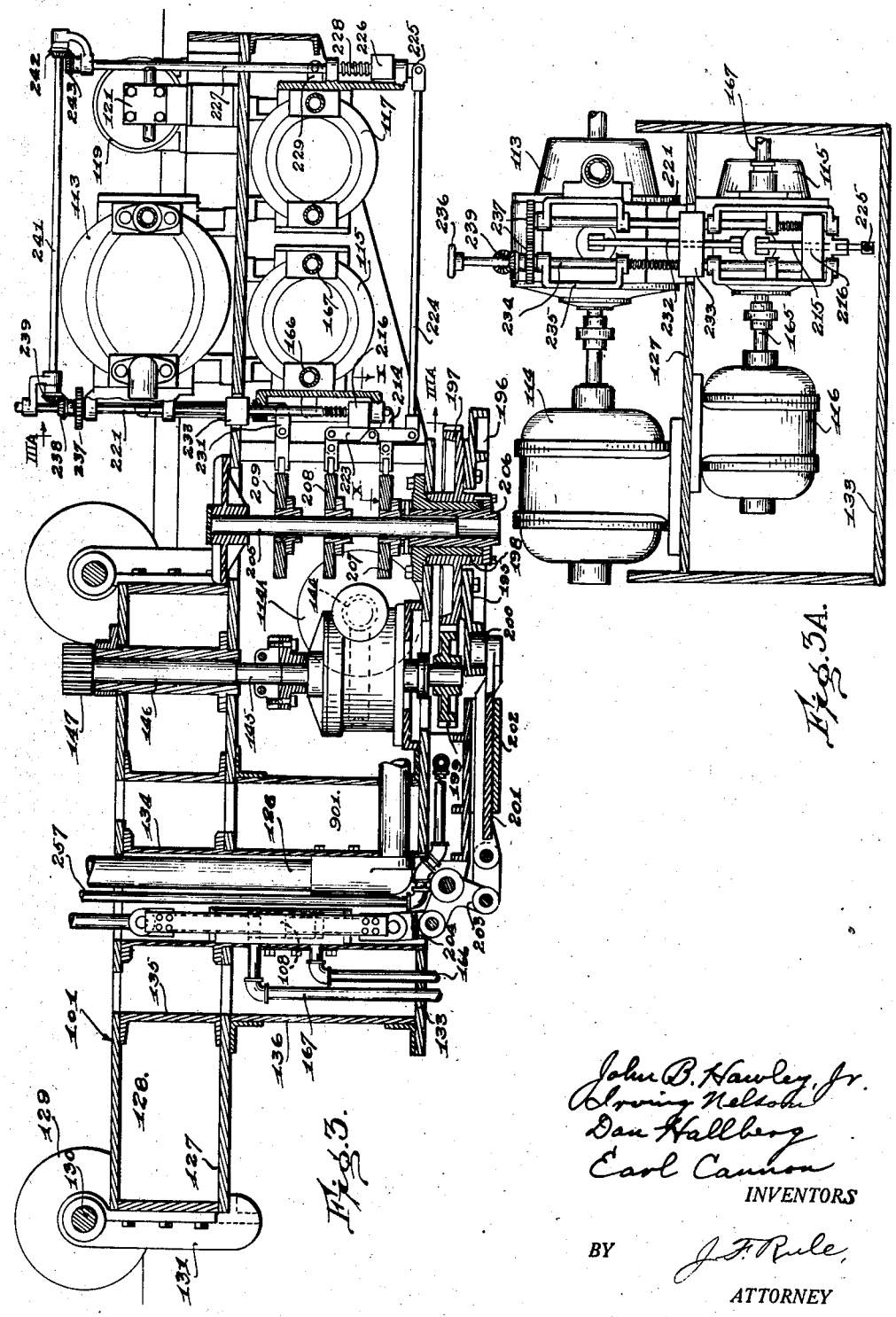
Fig. 3 is a longitudinal, part sectional elevation of the same.
Figure 18:
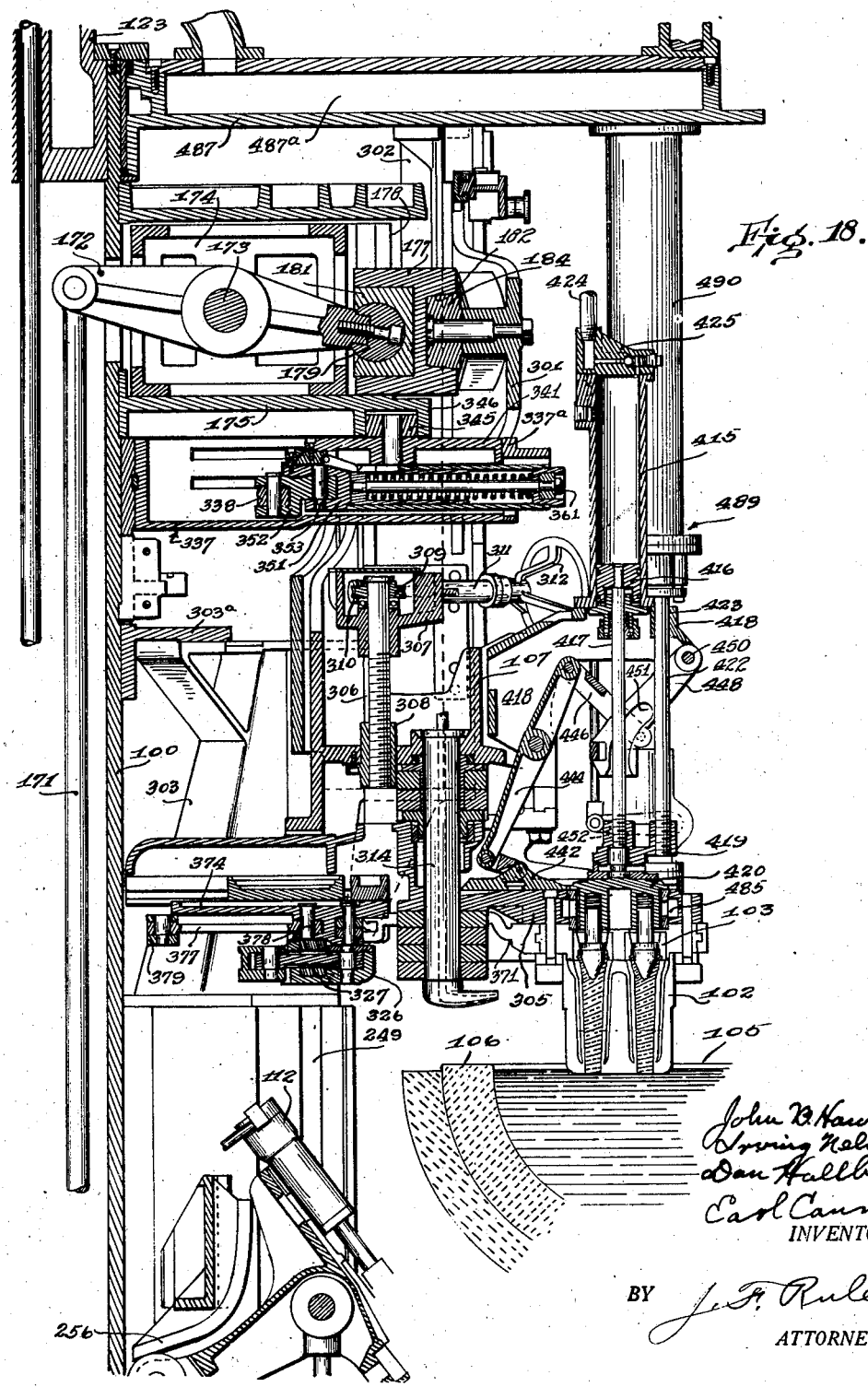

Figs. 7 to 13 relate particularly to mechanism for lifting and lowering the dip heads which carry the blank molds;

Fig. 7 is a detail view in sectional elevation showing one of the hydraulic piston motors (herein termed a dip head motor) for lifting and lowering a dip head and the blank mold carried thereby;

Fig. 8 is a central sectional elevation of the hydraulic pump (herein termed the dip head pump) which operates the dip head motors, said view being in a plane perpendicular to the axis of the pump;

Fig. 9 is a sectional elevation of the same in the vertical plane of the axis;

Fig. 10 is a horizontal section at the line X—X on Fig. 3, showing mechanism for controlling the dip head pump;

Fig. 11 is a bottom plan view of cam controlled mechanism for controlling the movements of the dip heads;

Fig. 12 is a section at the line XII—XII on Fig. 11;

Fig. 13 is a section at the line XIII—XIII on Fig. 7;

Fig. 14 is a plan view of a finishing mold and its operating mechanism;

Fig. 15 is a section at the line XV—XV on Fig. 14;

Fig. 16 is a central vertical section of the finishing mold and its operating mechanism;

Fig. 16A is a sectional view of a spring buffer device for cushioning the finishing mold carrier as it completes its downward movement;

Fig. 17 is a front elevation showing a blank mold unit;

Fig. 18 is a sectional side elevation of a blank mold unit, the mold being shown in its lowered position for gathering charges of glass;

Fig. 19 is a side elevation of the blank mold unit with the mold in its lifted position;

Fig. 20 is a fragmentary view showing means for supporting the dip head independently of its cam;

Fig. 21 is a section at the line XXI—XXI on Fig. 19;

Fig. 22 is a diagrammatic view with certain parts shown in section, showing the dip pump, the dip head operating motor driven thereby, the blank mold cracking motor and its pump, the knife operating motor, and the hydraulic circuits and controlling devices for said pumps and motors;

Figs. 23, 24 and 25 are diagrammatic views of the cams shown in Fig. 3 for controlling the main hydraulic pumps;

Fig. 23 shows the cam for controlling the main drive pump by which the mold carriage is driven;

Fig. 24 shows the cam for controlling the up and down movements of the dip heads;

Fig. 25 shows the cam controlling the lifting and lowering of the finishing mold carriers;

Fig. 26 is a diagrammatic view of the cam which mechanically controls the movements of the dip heads; and Fig. 27 is a timing chart indicating the timing and sequence of the various operations.

*General construction*

Figure 1:
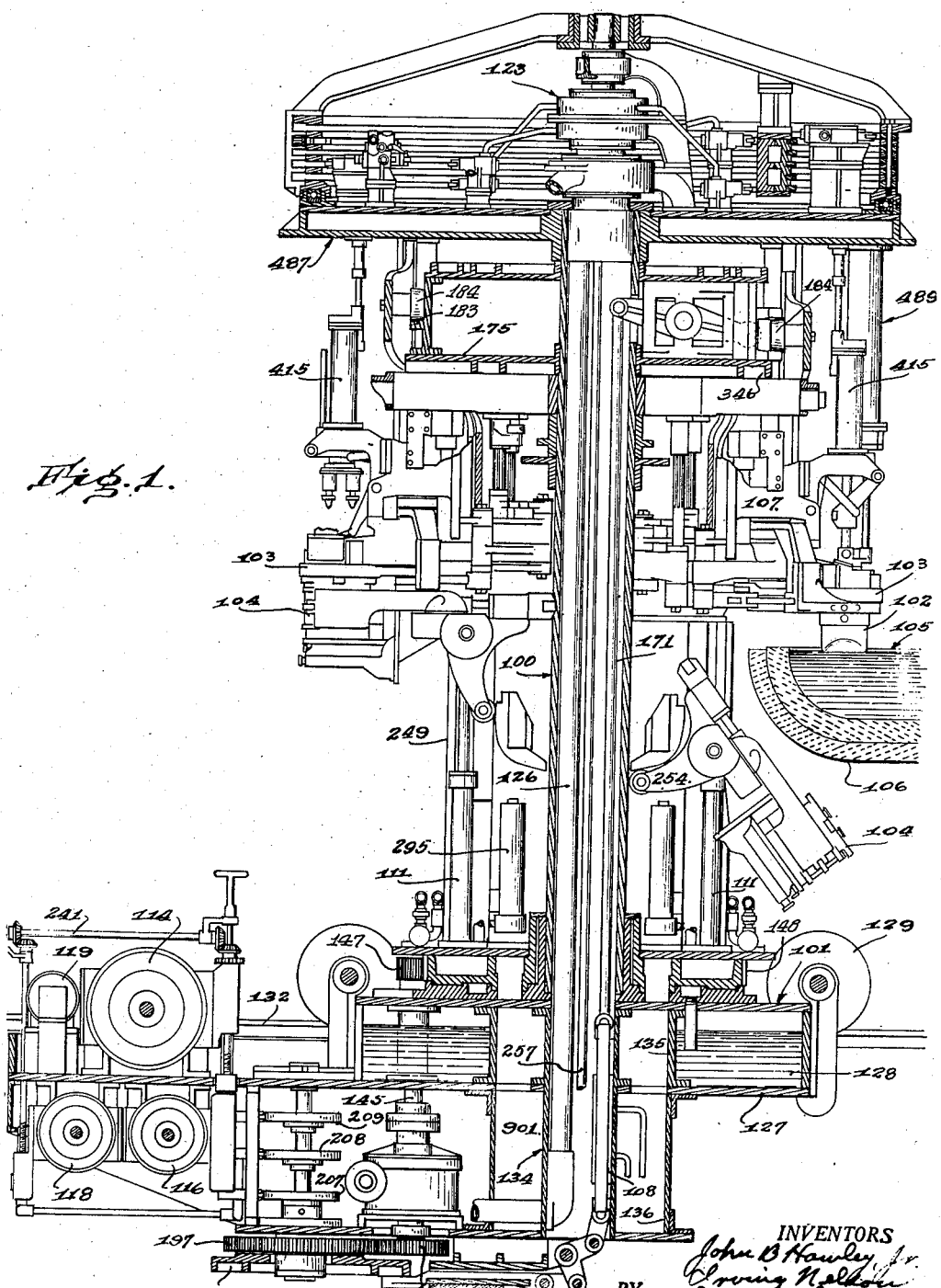
Fig. 1 is a part sectional elevation view of a machine constructed in accordance with our invention.

A general statement of the construction and arrangement of parts will now be given, followed by a more detailed description of the machine and mode of operation. The machine comprises a mold carriage mounted to rotate about a tubular column 100 (see Figs. 1, 6 and 16) bolted to and rising from a horizontal plate 101 which forms part of the base of the machine. The mold carriage includes five heads or units symmetrically arranged about the axis of the carriage. Each unit includes a mold group and their operating mechanisms.

Each mold group includes a blank mold 102 (see Fig. 18), a neck mold 103 above and in register with the blank mold, and a finishing mold 104 (Fig. 16). The blank and neck molds together form a parison mold which, during each rotation of the mold carriage, is brought over a pool 105 of molten glass within a pot or container 106, and lowered into contact with the glass. Suction is then applied for filling the mold cavities. To permit the lowering of the parison mold into contact with the pool, it is carried by a dip frame or head 107 which is lifted and lowered by a piston motor 108 (Fig. 7) hydraulically operated as hereinafter set forth. When the parison mold is lifted out of dip, the glass trailing therefrom is severed by a knife in a conventional manner. The blank mold is then opened and the finishing mold (Fig. 16) lifted by a hydraulic piston motor 111, and closed around the suspended parisons by a hydraulic piston motor 112, the parisons being then blown to final form in the mold.

Figure 2:
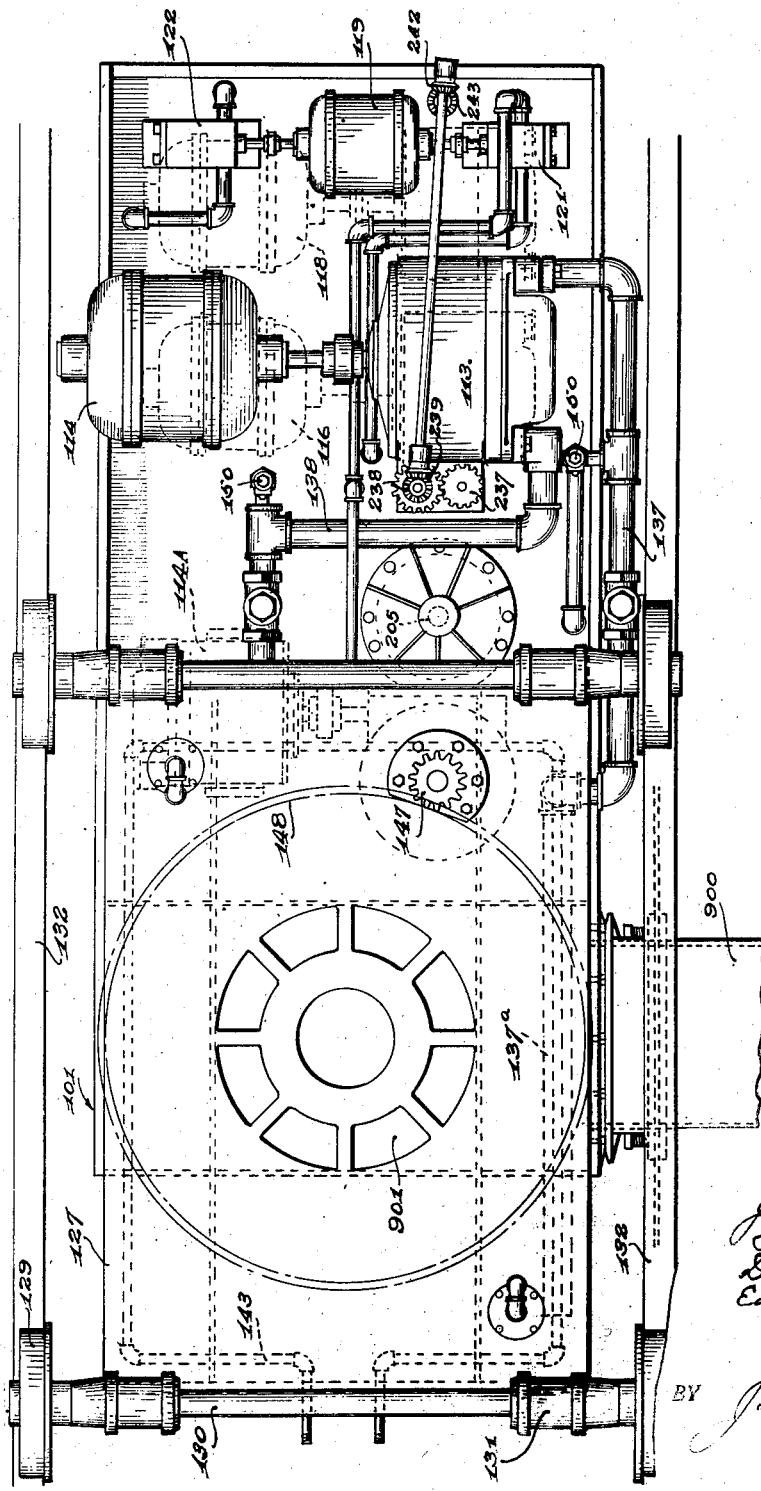
Fig. 2 is a plan view of the machine base and certain of the pumps and motors mounted thereon.

The major operations of the machine are effected by power supplied from three motor-driven hydraulic pumps mounted on the base of the machine, as shown in Figs. 2, 3 and 3A. These include a rotary pump 113 (hereinafter referred to as the drive pump) directly connected to and driven by an electric motor 114, a rotary pump 115 (hereinafter referred to as the dip pump) driven by an electric motor 116, and a rotary pump 117 (hereinafter referred to as the mold carrier pump) driven by an electric motor 118. The drive pump 113 operates through mechanism hereinafter described to continuously rotate the mold carriage at a periodically varying speed. The dip pump 115 operates a piston type hydraulic motor by which the dip heads carrying the blank molds are lifted and lowered. The mold carrier pump 117 drives the hydraulic motors 111 for lifting and lowering the finishing molds. An electric motor 119 (Figs. 2 and 3) also mounted on the machine base, operates a slippage pump 121 and a pump 122 which actuates the blank crack motors by which the blank molds are given an initial opening movement.

Air under pressure for blowing the glass in the molds and for cooling purposes is supplied to the several units through a distributing head 123 (Fig. 1) at the top of the machine, said head being supported on the column 100. The air under pressure is conducted to the distributing head through pipes 124 and 125 (Fig. 13) which extend upward to the distributing head through the column 100. The application of vacuum to the molds for gathering and shaping the glass therein is controlled through vacuum lines leading to the distributing head from which the main vacuum pipe 126 extends downward through the column 100 and through the base of the machine to a suction pump or other source of vacuum.

Machine base

The machine base (Figs. 2, 3 and 3A) includes a main base plate or platform 127 which provides a support for the entire machine. Above this base plate is an oil reservoir or tank 128 from which oil is supplied to the hydraulic pumps and motors. Wheels 129 which carry the machine are mounted on axles 130 having bearings in brackets 131 attached to the side walls of the tank 128. The wheels run on tracks 132, permitting the machine to be moved to and from the gathering tank 106. A sub-base plate 133 is spaced below the main base plate 127. Beneath the column 100 and in vertical alignment therewith (see Figs. 3 and 16) is a tubular section 134 extending from the cover plate of the oil reservoir downward to the sub-base plate 133. Surrounding the section 134 and concentric therewith are cylindrical walls 135 and 136 which, with the member 134, provide an annular passageway through which cooling air is conducted for application to various parts of the machine, as hereinafter set forth.

Carriage drive

Figure 4:
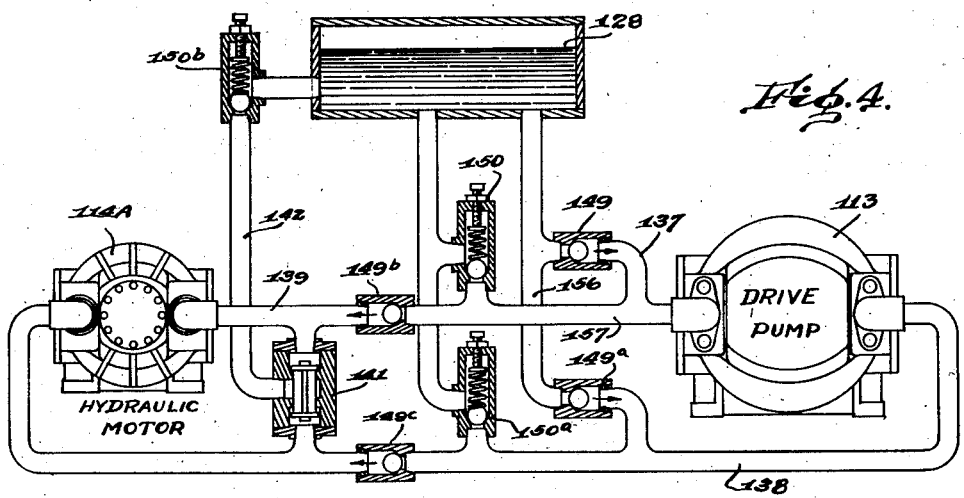
Fig. 4 is a diagrammatic view of the hydraulic pump and motor by which the mold carriage is driven, and the hydraulic circuits and controlling devices therefor, certain parts of the mechanism being shown in section.

Referring to Figs. 2 to 4, inclusive, the mechanism for rotating the mold carriage is as follows: The rotary hydraulic pump 113, when driven by the electric motor 114, draws the oil or other operating fluid from the reservoir 128 through pipe line 137. The oil is driven by the pump through pipe line 138 to the rotary hydraulic motor 114A, thereby driving the latter. The oil after circulating through the motor is returned to the tank through pipe line 139 (Fig. 4), a differential valve 141 and pipe 142.

The oil in the reservoir is maintained at a working temperature by circulating a temperature regulating fluid through a pipe line 143 (Fig. 2) within the oil reservoir. During the normal operation, this fluid may consist of cold water for extracting heat from the oil. However, in starting the apparatus when cold, it is sometimes necessary to heat the oil to a working temperature and this is done by circulating steam through the pipe 143. The pipe line 137 includes a section 137ª within the oil tank and extending lengthwise thereof, through which section the pipe 143 extends. With this arrangement, the oil supplied to the driving pump 113 is brought into close contact with the pipe 143 so that its temperature is effectively controlled.

The shaft of the motor 114A has a worm driving connection 144 with a vertical drive shaft 145 which extends upward through a bearing sleeve 146 in the oil reservoir. Secured to the upper end of the drive shaft is a pinion 147 which meshes with an annular drive gear 148 (Figs. 1 and 2) on the lower end of the mold carriage.

Referring to Fig. 4 which shows diagrammatically the circuits for the drive pump and motor, check valves 149, 149ª, 149ᵇ and 149ᶜ are placed in the circuits as indicated. These are one-way valves which permit a flow in the direction indicated by the arrows. Pressure relief valves 150, 150ª and 150ᵇ are also provided.

As above described, the circulation of oil is from the tank through pipe 137 to the pump 113 and from the pump to the motor 114A through pipe 138. However, the direction of flow through the pump and motor, and consequently their direction of rotation, may be reversed in a manner hereinafter explained. When thus reversed, the circulation is from the tank through pipe line 156 and check valve 149ª to the pump and from the pump through line 157, check valve 149ᵇ, and line 139 to the motor 114A. From the motor the oil is returned to the tank by way of the differential valve 141, pipe 142 and pressure relief valve 150ᵇ.

The valve 141 is connected across the pipe lines 138 and 139 extending from the terminals of the hydraulic motor 114A so that the position of the valve piston is controlled by the pressure differential between said terminals. The construction of the valve is such that it opens communication from the low pressure or exhaust port of the motor to the tank. The arrangement is such that the motor can be driven by the pump in either direction and without either the pump or motor being short circuited by the pipe lines leading to the tank.

The relief valves 150 and 150ª are connected in circuit between the tank and the lines 157 and 138 leading, respectively, to the pump terminals or ports. Any excess pressure built up in the line 137 will operate relief valve 150, permitting a return flow to the tank independently of the pump. The relief valve 150ª will operate in like manner to prevent any excess pressure being built up in the line 138. Such pressures may be caused by an overload on the motor 114A, the relief valves then providing a return circuit from the pump to the tank independently of the motor, thereby preventing an overload on the pump.

Dip head mechanism

A description will now be given of the mechanism by which the dip heads 107 which carry the gathering molds are lowered to bring the molds into dip while traversing the gathering area and then lifted. The lifting and lowering movements of all the dip heads are effected by the piston motor 108 (Figs. 3 and 7), which motor is driven by the rotary hydraulic pump 115, the latter in turn being continuously driven by the electric motor 116 (Fig. 3A), the drive shaft 165 of which is directly connected to the drive shaft of the pump 115. Pipes 166 and 167 extend from the motor 115 to the motor 108, opening, respectively, into the lower and upper ends of the motor cylinder.

The motor 108 comprises a piston 168 and piston rod 169. A vertical connecting rod 171 (Figs. 7 and 18) is pivoted at its lower end to the piston rod, and at its upper end is pivoted to the inner end of the dip head lever 172. Said lever is fulcrumed on a pivot pin 173 mounted in a frame 174 which in turn is mounted on a cam plate 175 fixed to the center column 100. The outer end of the dip lever 172 has a pivotal connection with a block 177 which serves as a connector through which the dip heads are connected in succession to the dip lever 172. This connector 177 is mounted to reciprocate vertically and is guided in its movements by guide bars 178 on the frame 174. The pivotal connection between the lever 172 and the connector 177 includes a cylindrical bearing head 179 bolted to the lever, and a bearing block 181 in which the head 179 is journaled. The block 181 is mounted in the connector 177, being free for limited movement radially of the machine to accommodate the arcuate movement of the bearing head 179. The connector 177 is formed in its outer face with a cam track or groove 182 extending lengthwise thereof. The cam track is periodically brought into alignment with a stationary cam track 183 (Fig. 1) which is concentric with the mold carriage. Each dip head carries a cam roll 184 which runs on the track 183 and controls the vertical position of the dip head.

As each dip head during its travel with the mold carriage, approaches a position over the gathering tank, its cam roll 184 runs off the track 183 onto the track 182 which at this time is in alignment therewith. The dip lever 172 is then operated by its motor 108 to lower the dip head to the Fig. 18 position so that the mold 102 is brought into dip for gathering its charge. The motor 108 is then reversed to lift the dip head, the track 182 being thereby brought in line again with the track 183, permitting the dip head to continue its travel with the mold carriage, with the cam roll 184 again running on the cam track 183.

The rotary hydraulic pump 115, as shown in Figs. 8 and 9, may be of standard construction and need not be described in detail. Briefly, it comprises a casing 185 in which is journaled a driving shaft 186. A rotor 187 is mounted for rotation in an adjusting frame 188, the latter slidably mounted in the casing 185 for reciprocating the rotor within the casing. The shaft 186 has keyed thereto a driving element 189 formed with radially disposed cylinders 191 in which reciprocate pistons 192 carried by said rotor. The frame 188 is provided with a stem 193 extending outward through an opening in the casing and having connections as hereinafter described for shifting the rotor.

When the drive shaft is rotated, the rotor being mechanically connected is rotated therewith. If the rotor is eccentric to the drive shaft, such rotation causes a reciprocation of the pistons and thereby forces a driving fluid to circulate through the pump, the fluid entering by way of one of the ports 194 and leaving through the other of said ports. When the rotor 187 is shifted from one side to the other of a central position, the direction of fluid circulation is reversed, thereby reversing the piston motor 108.

The lifting and lowering movements of the dip head are positively controlled by mechanical means supplemental to the hydraulic piston motor 108. Such mechanical means (see Figs. 3, 7, 11, 12 and 26) includes a cam plate 195 formed on its under surface with an endless cam track 196, said cam plate being bolted to the under face of a gear wheel 197 mounted for rotation on a bearing sleeve 198, the latter bolted to the base plate 133. The gear wheel 197 is driven by a pinion 199 keyed to the lower end of the drive shaft 145. The gears are so proportioned that the cam plate 195 is given five complete rotations during each rotation of the mold carriage. A cam roll 200 which runs on the cam track 196 is carried by a slide bar 201 mounted to reciprocate in a guide 202, said bar having a link connection to one arm of a bell crank 203, the other arm of which is connected to a link 204 (Fig. 7) which may be slidably mounted on the motor piston rod 169. The lower, headed end of the piston rod forms a stop to limit the downward sliding movement of the link on the rod.

With this construction, the lifting or up movements of the dip heads are positively controlled by the cam 196. This control serves as a safety feature acting positively to synchronize the lifting movements of the dip heads with their rotary travel with the carriage. In this manner, failure of a dip head to lift the mold at the proper time, which might cause interference between the mold and the gathering tank, is positively prevented. It will be understood, however, that the up and down movements of the dip heads are normally effected and controlled by the hydraulic motor 108. The sliding connection between the link 204 and the piston rod 169, permits the linkage between the cam 196 and the piston rod to operate idly when any selected dip head is temporarily held up by means hereinafter described, and prevented from going through its normal dipping movements. That is to say, if a dip head is held in its up position, the piston rod 169 is held in its lowered position, so that the link 204 can slide idly up and down on the rod. But when a dip head is down, the piston rod is up and holds the link 204 in the up position, and when the link is drawn down by the cam 196, it draws the piston rod down and lifts the dip head.

Speed control and synchronization of hydraulic pumps and motors

The speeds of the three hydraulic pumps 113, 115 and 117 are controlled by cam mechanism which automatically effects the periodic variations in the speed of each pump as required for the operation of the various motors driven by the pumps. This cam mechanism will now be described, reference being had particularly to Figs. 2, 3, 3A and 10. A vertical cam shaft 205 (Fig. 3) is continuously rotated by the gear wheel 197. A driving connection between said shaft and gear is provided by a bearing sleeve 206 keyed to and forming an extension of the shaft 205, said sleeve rotating in the bearing sleeve 198. The sleeve 206 is formed with a flange bolted to the hub of the gear wheel 197. Keyed to the cam shaft are cams 207, 208 and 209 (shown in detail in Figs. 23 to 25) controlling, respectively, the dip pump 115, the pump 117 for lifting and lowering the finishing mold carriers, and the drive pump 113 which rotates the mold carriage. It will be noted that during each complete rotation of the mold carriage, the cam shaft 205 is given a number of rotations equal to the number of heads or units on the mold carriage—in this instance five. Each cam on said shaft, therefore, operates during a complete rotation of the mold carriage, to effect five complete cycles of operations of the pump controlled thereby, namely, one cycle for each head or unit.

The cam 207 operates through the following mechanism to control the speed of the dip pump 115. A cam roll 211 (see Fig. 10) runs on the cam 207, said roll being carried by a block 212 slidable in a guide frame 213. A link 214 connects the block 212 with the lower end of a vertically disposed lever 215. This lever has a pivotal mounting in a bearing block 216 which, as shown in Fig. 10, is made in sections secured together by bolts 217. The connection between the lever 215 and the block 216 includes a rectangular sleeve 218 through which the lever extends and which has a sliding connection with the lever. The sleeve 218 is formed with trunnions 219 journaled in the block 216 and providing a fulcrum for the lever. A vertical adjusting rod 221 extends through the block 216 and has a screw threaded connection therewith. The rod 221 is rotatable manually by means presently to be described, for adjusting the block 216, and with it the sleeve 218, up and down, and thereby shifting the fulcrum of the lever 215.

The upper end of the lever 215 (see Fig. 8) is connected to the stem 193 which, as before described, is connected for adjusting the pump shaft and thereby controlling the speed and direction of rotation of the pump. A coil spring 222 reacts through the lever 215 to maintain the cam roll 211 in contact with its cam. The dip cam 207 is so designed that during each rotation it operates through the connections just described to drive the dip pump, first, in the direction required to lift the piston 168 (Fig. 7) for lowering a dip head, then stop the pump while the mold is in dip and gathering its charge of glass, then rotate the drive pump in the reverse direction for lowering the piston 168 and lifting the mold out of dip, and finally arresting the pump.

The cam 208 which controls the mold carrier pump 117 for effecting the lifting and lowering of the finishing mold carriers, operates through connections including a lever 223, the upper end of which is connected to the cam roll and the lower end of which is connected through a link 224 to the lower end of a lever 225. The latter extends through a bearing block 226, the construction of which may be substantially identical with that of the block 216 (Fig. 10). A vertical rod 227 has a screw threaded section 228 extending through the block 226 for adjusting the latter up and down. The upper end of the lever 225 has a connection 229 with the pump 117.

The cam 209 which controls the speed of the drive pump 113, operates through a link 231 and lever 232, the latter having a connection at its upper end with the pump. The lever 232 extends through a bearing block 233 which may also be of the same construction as the block 216. An adjusting shaft 234 extends through the block 233 and has a threaded connection therewith. The adjusting rods or shafts 221 and 234 are journaled in bearing brackets 235 and both said shafts extend through both the bearing blocks 233 and 216.

A hand wheel 236 is attached to the rod 234. Intermeshing gears 237 are keyed to the shafts 221 and 234, respectively. Intermeshing bevel gears 238 and 239 are mounted, respectively, on the shaft 234 and a horizontal shaft 241, the latter having a driving connection through bevel gears 242 and 243 with the shaft 227.

It will be seen that the three adjusting shafts 221, 234 and 227 are interconnected through the gearing just described, so that rotation of the hand wheel 236 will rotate all of said shafts, thereby effecting a simultaneous and synchronized adjustment of the three rotary driving pumps. Thus, when the speed of the mold carriage is manually adjusted, the speed and timing of the dip head movements and the movements of the finishing mold carriage will be correspondingly adjusted and maintained in synchronism.

*Finishing mold carriers and mechanism for lifting and lowering them*

The pump 117, as heretofore noted, operates the hydraulic piston motors 111 (Figs. 5 and 16) individual to the finishing mold units for controlling the up and down movements of the finishing molds and their carriers.

Referring to Figs. 14 to 16, each finishing mold 104 is supported on a carrier unit 244 which is reciprocated vertically, the mold also being given a swinging movement under the control of a cam 256. The piston rod 245 of the motor 111 has connected to its upper end a head 246 through which a pivot rod 247 extends transversely, the ends of the pivot rod having bearings in a frame 248 which forms part of the mold carrier unit. Each frame 248 is mounted for vertical sliding movement in a supporting and guiding frame 249. The frame 249 (see Fig. 6) comprises sections secured by bolts 251 to the lower plate 252 of the mold carriage. Guide strips 253 (Fig. 14) overhang the front faces of the vertically sliding frames 248 and hold them in position within the guiding frame 249.

Each carrier unit 244 includes a swinging frame 244ª journaled on the pivot rod 247 and carrying the mold 104. The swinging section 244ª includes a depending arm 254 carrying a cam roll 255 which runs on the cam 256 which controls the swinging movements. Fig. 16 shows the finishing mold in its lifted or parison transfer position. As the mold carrier is lowered, it has an initial vertical movement and then the frame section 244ª swings inward to the dotted line position (Fig. 16).

This combined vertical and swinging movement permits a very compact arrangement of the parts so that the mold radius of the machine, or radial distance of the mold from the axis of the carriage, can be made much shorter than with the usual arrangement found in Owens type machines wherein the lifting and lowering of the finishing mold is entirely a swinging movement about a horizontal axis. The present construction also permits the mold to be lowered sufficiently to clear the gathering pot 108 while maintaining a relatively short radius of swing.

Hydraulic pressure is transmitted from the pump 117 by way of a pipe line 257 (Figs. 1 and 3) including a pipe which extends from the bottom of the machine upward through the center of the column 100 to the distributor head 123. The pressure line is extended from the distributor head downward through a conduit 263 (see Fig. 6) formed in the frame 249, said conduit at its lower end communicating through a pipe section 264 with a distributing pipe 265 which extends entirely around the mold carriage.

Figure 5:
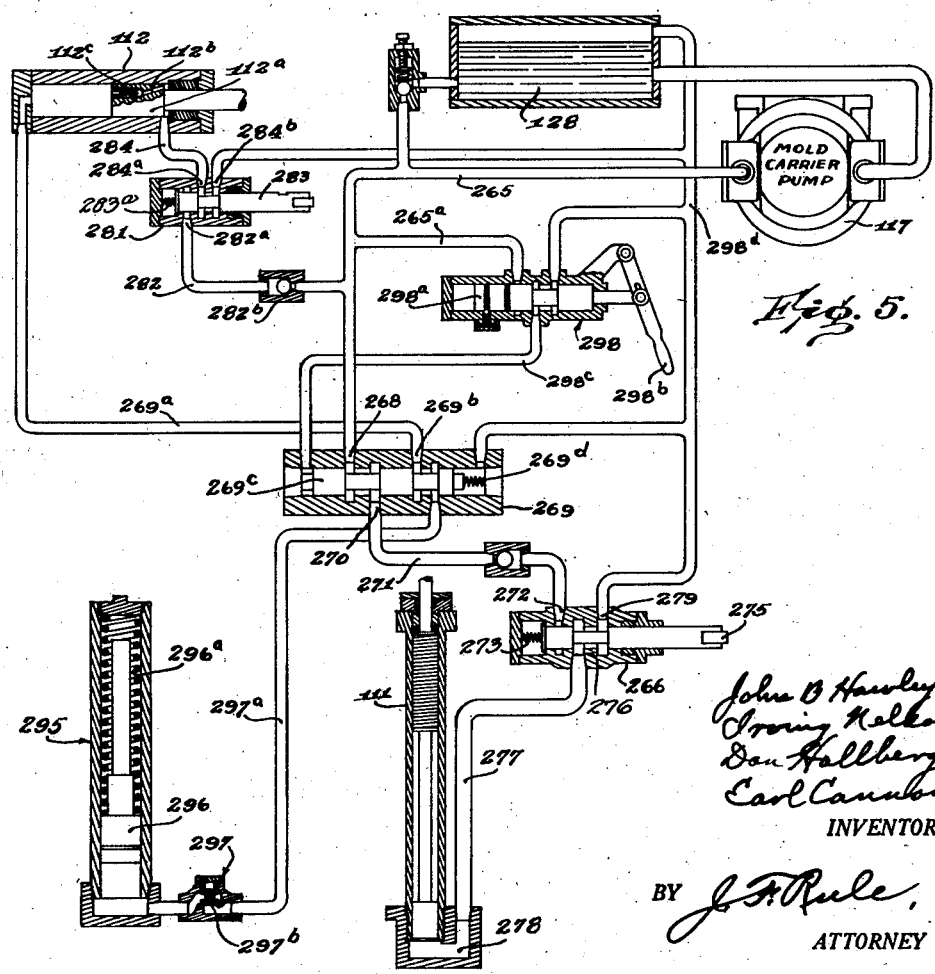
Fig. 5 is a diagrammatic view showing a hydraulic motor for opening and closing the blank molds, a hydraulic motor for lifting and lowering the finishing mold carrier, and valve mechanism and hydraulic circuits for said motors, certain parts of the mechanism being shown in section.

Referring to Figs. 5 and 6, valves 266 individual to the piston motors 111 are operative, each to connect the pressure distributor pipe 265 with its motor. Each of the connecting lines from the pipe 265 to the corresponding piston motor includes a safety interlocking valve 269 (hereinafter described). The line is open through a port 268 to the valve 269 and from the valve continues through a port 270 and pipe 271 (Figs. 5 and 6) to an intake port 272 of valve 266. The intake or pressure port 272 is closed by the valve piston under the influence of a coil spring 273. This is the normal position while the finishing mold is in its lowered position. The valve piston is actuated by a stationary cam 274 (Fig. 6) which, as the mold carriage rotates, is engaged by a cam roll 275 on the valve piston and moves the latter to the left (Fig. 5), thereby opening the pressure port 272 to a port 276 from which a pipe 277 leads to a channel 278 opening into the lower end of the motor cylinder. This supplies pressure for lifting the motor piston and with it the mold carrier.

The valve 266 is provided with an exhaust port 279 which communicates with the port 276 when the valve piston is released from its cam and moves to the Fig. 5 position. This allows the mold carriage to lower, the escaping oil from the motor 111 being returned to the supply tank as the carriage descends.

*Finishing mold opening and closing mechanism*

The finishing mold opening and closing mechanism is illustrated in Figs. 5, 6, and 14 to 16, and is operated by means of hydraulic pressure controlled by a valve mounted at the base of the mold carriage on the plate 252.

Referring to Fig. 5, valves 281, individual to the mold opening and closing motors 112, serve to connect the pressure distributor pipe 265 with each of the motors. A pipe 282 extends from the pipe 265 to connect with an intake port 282ᵃ in the valve 281. A check valve 282ᵇ in the line 282 operates as hereinafter described to prevent any decrease in pressure during the mold closing operation. The valve 281 includes a piston 283 which is shown moved to the right or in its outward position required for holding the molds closed. A coil spring 283ᵃ maintains constant pressure to force the piston 283 toward the right, thus sealing the intake port 282ᵃ. A port 284ᵃ is connected by a pipe 284 to the front end of the piston motor 112, the ports 282ᵃ and 284ᵃ being brought into communication when the valve piston 283 is moved inward or to the left to cause opening of the mold at the point of delivery. An exhaust port 284ᵇ is in communication with the port 284ᵃ when the valve piston is in the position shown (Fig. 5).

The valve piston 283 is moved inward against the tension of the spring 283ᵃ by means of a cam 283ᵇ (Fig. 6) for effecting the opening of the finishing molds.

*Finishing mold closing mechanism (accumulator)*

Each finishing mold unit includes an accumulator 295 (Figs. 5, 6, and 16) for closing the molds, the said accumulator being under the control of the valve 281. The accumulator comprises a cylinder 295ᵃ and a piston 296 mounted within the cylinder and which carries a coil spring 296ᵃ to force the piston toward the bottom of the cylinder. A check valve 297, which is opened by fluid pressure in the direction of the cylinder, is located in the feed pipe 297ᵃ and permits oil to flow into the cylinder. A metering port 297ᵇ in the valve allows pressure to escape for closing the molds.

The oil for charging the accumulator is supplied thereto through the motor 112 when oil under pressure is supplied to the front end of the motor for causing it to open the molds. The motor piston 112ᵃ is provided with a bypass 112ᵇ in which is a ball check valve 112ᶜ for retaining the mold closing pressure. After the molds are open, the oil from the valve 281 flows through the bypass 112ᵇ and into a pipe 269ᵃ leading to a port 269ᵇ in the safety interlocking valve 269. The port 269ᵇ connects with the pipe 297ᵃ leading to the cylinder 295 to complete the circuit. Pressure entering the cylinder overcomes the pressure of the spring 296ᵃ and raises the piston 296. When the valve 281 is shifted to close the molds, thereby releasing the pressure on the front end of the piston 112ᵃ, the piston 296 descends a certain distance determined by the displacement of the piston 112ᵃ.

Associated with the safety interlocking valve 269 of each mold carriage unit is a manually operable valve 298 (Figs. 5 and 26) which provides a safety feature. Should a part of the mechanism break or become damaged to the extent of placing the unit out of service, the valve 298 may be operated and functions as hereinafter explained, to prevent lifting of the mold carrier or closing of the mold. The valve 298, which may be mounted at any suitable place on the machine, includes a plunger 298ᵃ shiftable by means of a hand lever 298ᵇ. The valve is shown in the position assumed when the mold carriage is in normal operation. A pipe 298ᶜ connects the valve 298 with one end of the safety interlocking valve 269, and a pipe 265ᵃ connects the valve with the pressure line 265. With the valve piston 298 in the position shown, the line 265ᵃ is closed and the line 298ᶜ open through the valve to a return line 298ᵈ leading to the supply tank 128. This permits a coil spring 269ᵈ in the safety interlocking valve to hold the plunger 269ᶜ in the position shown. When the hand lever 298ᵇ is operated to shift the plunger 298ᵃ to the left, a pressure line is established including pipes 265, 265ᵃ, valve 298 and pipe 298ᶜ leading to the valve 269. The valve plunger 269ᶜ is, therefore, moved to the right and closes the circuits through pipes 269ᵃ, 270 and 297ᵃ. This prevents lifting of the mold carrier and closing of the mold.

The mold raising motor 111 is provided with a coil spring 111ᵇ which serves as a means for cushioning the upward stroke of the mold carriage.

The cushioning means for the down stroke is in the form of a bumper 249ᵃ (Fig. 16A) mounted beneath the slide frames 249 and comprises a coil spring enclosed within sleeves 249ᵇ, the outer sleeve having a hardened steel cap for engagement with the slide frames.

*Parison mold and head group*

Figs. 17 to 21 inclusive illustrate mechanism comprising a parison mold unit, the description of which follows:

The dip head 107 includes a dip frame 301 mounted for vertical sliding movement in slide rails 302. The slide rails are bolted to brackets 303 (Figs. 17, 18 and 19) secured to the upper end of the finishing mold guide 249, and rotate as a unit therewith. The brackets 303 are braced against centrifugal strains by means of a flanged ring 303ª surrounding the central column 100.

As heretofore described, the dip frame 301 is provided near its upper end with a cam roll 184 for periodically connecting the dip frame with means for lowering and lifting it and thereby bringing the blank mold into and out of contact with the supply body of molten glass. The mold 102 is supported on a supporting head 305 (Fig. 18) carried by and vertically adjustable on the dip frame 301.

Mechanism is provided for adjusting the mold and its supporting head 305 up and down relative to the dip frame. Such mechanism includes a threaded rod 306 (Fig. 18), the upper end of which is journalled for rotation in a housing 307 secured to the dip frame. The lower end of the rod 306 is threaded into a sleeve 308 connected to the head 305. Rotation is imparted to the rod 306 by means of a worm gear 309 secured to the upper end thereof within the housing 307. The worm gear is engaged by a worm 310 on a shaft 311 which extends radially outward and is provided with a hand wheel 312. Rotation of the hand wheel effects a vertical adjustment of the blank mold group in relation to the finishing mold unit, as is at times necessary to insure proper registration of the molds during the operation of the machine.

Each blank mold 102 comprises a pair of mold halves, supported by arms 313 journaled on a hinge pin 314 carried by the head 305. The opening and closing movements of the blank mold are effected by a stationary cam 346 on which runs a cam roll 345 having operating connections with the mold through mechanism which will now be described.

Such mechanism includes pairs of links 315 and 315ª pivotally connected at 315ᵇ. The links 315 are pivoted to the mold arms 313 and the links 315ª are pivoted at their outer ends to crank arms 318. The cranks 318 are mounted on shafts 319 journaled in the head casting 305 and extend upwardly therethrough. Springs 324ª carried on rods 323, are held under compression and operate through suitable connections including shafts 319 and cranks 318, to exert an outward pressure on the links 315ª, thus securing a positive locking of the molds in closed position. The operating connections between the blank mold and its cam 346, further include a vertical shaft 334 operative through suitable connections (not shown) to rock the shafts 319 above referred to. The upper end of the shaft 334 has a splined connection 335 with a bearing sleeve 336, mounted for rotation in a frame 337 secured by a tie bar 337ª to the slide rails 302 for rotation with the mold carriage. A rock arm 338 is keyed to the sleeve 336 within the frame 337 and is adapted to impart motion to the shaft 334 for opening and closing the blank molds. The rock arm 338 is connected (see Fig. 18) through a link 352 and pivot 353 to a slide block 351 forming one element of a safety device which also includes a slide block 341 on which the cam roll 345 is mounted. This safety device and connecting mechanism between the same and the blank mold, are not in themselves a part of the present invention and need not be herein described in further detail.

The neck mold 103 is of standard construction and comprises neck mold halves supported in a pair of arms 371 (Fig. 18) pivoted on the hinge pin 314. The arms 371 are operatively connected to a drawbar 374 slidably mounted for movement radially of the mold carriage. A draw link 377 pivoted to the bar 374 at 378, provides operating connection with a rock arm 379 mounted on a vertical shaft 380 (Fig. 19) carried at the inner end of the head casting 305. A plate 381 (Fig. 21) bolted on the casting 305 provides the lower bearing for a vertical splined shaft 382.

A pair of meshing gear segments 383 and 384 respectively are secured on the shafts 380 and 382 so that the rotation of the shaft 382 imparts movement to the neck mold through the mechanism just described. The upper end of the splined shaft 382 is disposed within a splined sleeve 385 rotatably mounted in the frame 337. A rock arm 387 (Fig. 21) carrying a cam roll 388 is keyed to the sleeve 385 beneath the frame 337. A stationary cam plate 389 supports a cam 390 (shown in dotted lines in Fig. 19), which cam periodically engages the cam roll 388 and operates through the mechanism just described to open the neck molds.

Means for closing the neck molds comprises a spring 393 (Fig. 21) mounted on a rod 391 pivoted at one end to the gear segment 384 and having its opposite end extending freely through an opening in an upright flange 392 mounted on the casting 305. The spring exerts pressure against the gear segment 384, thereby operating through the above described mechanism to close the neck mold and tending to hold it in closed position.

*Dip head support*

As before pointed out, each finishing mold is periodically lifted to a position at which it can be closed around the parison supported in the corresponding neck mold. It is important that the molds while thus in register be held against any relative movement. As a certain amount of vibration is imparted to the dip heads while they are supported by and travel along the stationary cam, means are provided for supporting each dip head directly on the corresponding finishing mold carrying frame 248 (Figs. 19 and 20) during such registration of the molds. For this purpose, each dip frame 301 is provided with legs 301ª in alignment with the finishing mold frame 248 thereunder so that when the latter is lifted to bring the finishing mold into line with the neck mold, the frame 248 lifts the dip frame 301 a short distance. This raises the cam roll 184 out of contact with the cam 182 as shown in Fig. 20, thus preventing vibration of movement of the dip head relative to the finishing mold frame.

Levelling pins 248ª mounted on the frame 248, are adapted to register with bushings 248ᵇ in the legs 301ª. As the finishing molds rise, the pins 248ª enter the bushings 248ᵇ so that the dip frame is securely held against lateral movement relative to the frame 248 while supported by the latter, and the finishing mold registers accurately with the neck mold.

*Plunger operating cylinder*

Each dip head 107 is provided with mechanism individual thereto for raising and lowering the plungers carried thereby and for operation of the associated blow slide, such mechanism being shown in Figs. 17 to 19.

The said mechanism comprises an air operated piston motor including a vertical cylinder 415 having therein a reciprocating piston 416 and a piston rod 417 extending through the lower end of the cylinder. The cylinder is mounted on a bracket 418 which is bolted to the lower part of the dip frame 301 and extends radially outward of the machine, thereby placing the cylinder in vertical alignment with the dip head.

Secured to the lower end of the piston rod 417 is a cross head 419 adapted to receive a plunger holder 420 which carries plungers 421 and holds them properly spaced for causing the plunger tips to enter the neck mold 103 when the plungers are lowered. A guide rod 422 secured to the head 419, extends vertically through an opening 423 in the bracket 418, thus maintaining proper alignment of the parts during raising and lowering.

The plunger is lowered by air under pressure which enters the cylinder 415 through a pipe 424 connected to the cylinder head 425. The plunger 416 is raised by admitting air under pressure through an air line leading to the lower end of the cylinder 415. The supply of air is controlled by a valve in the air line, said valve being actuated by a stationary cam. The valve and its actuating cam, which may be conventional, are not illustrated as they form no part of the claimed invention.

Blow slides 442 (Fig. 18) individual to the heads are arranged for horizontal sliding movement on the heads 305, each slide being operated by means of a link 444 pivoted to the bracket 418. A yoke 446 pivoted to the upper end of the link 444 is pivotally connected to a pair of cam members 448 journaled on a shaft 450 mounted at the outer edge of the bracket 418. The cams 448 are provided on their inner surfaces with cam grooves 451 adapted to receive rollers 452 carried on either side of the head 419.

As the plunger starts down the rollers 452 will draw the cam members 448 downwardly, causing the blow slide 442 by means of link 444 and the yoke 446 to move inwardly toward the center of the machine, out of the way of the descending plunger tips. As the plungers continue their downward movement, the rollers 452 run out of the grooves 451, leaving the entrance of the grooves facing downwardly to be reengaged by the rollers on the return stroke.

Each dip head 107 is provided with a vacuum chamber 485 (Fig. 18) arranged in the head casting 305 adjacent the gathering molds 102 and 103 in a manner to permit the application of suction to the mold cavities for filling the molds at the proper predetermined time.

A constant source of vacuum supply is maintained within a vacuum chamber 487a formed by a hollow upper spider or table 487. The table 487 is rotatably supported on the upper end of the central column 100 and is secured for rotation with the mold carriage by the dip head slide rails 302.

Communication between the vacuum chamber 485 and the upper vacuum chamber 487a is provided by means of a telescoping vacuum pipe 489 including a stationary or outer tube 490 bolted to the underside of the spider 487 and an inner reciprocating tube 491 connected to move up and down with the dip head. The application of suction to the parison mold is controlled by a valve (not shown) which may be located at the lower end of the tube 491 and actuated by a piston motor 511 (Fig. 17).

Air for cooling the various parts of the machine enters the base (Fig. 2) from any suitable source through a conduit 900 built into the machine support which carries the rails 132. The conduit is arranged to align with an opening in the base of the machine when it is in operating position at the forebay 106. A chamber 901 (Figs. 1, 2 and 3) communicates with the hollow finishing mold guide frame 249 from which cooling air is conducted to the mold carriers, the dip heads and for cooling the cut-off knives. The carrier guide frame 249 is formed to provide vertical passageways 902 (Figs. 6 and 14) through which air is conducted for circulation through the finishing mold arms 104a and also through the blank mold cooling nozzles, one of which is shown in Fig. 14 at 903.

*Mechanism for selectively preventing operation of the dip heads*

It is sometimes found desirable during the operation of the machine, to prevent one or more of the dip heads from going through the usual dipping movements while traversing the dipping and gathering zone. For this purpose, we have provided manually controlled mechanisms individual to the dip heads by which said heads may be selectively controlled and prevented from going into dip and the parison mold or molds thereon maintained in open position.

Each such mechanism includes a cam 832 (Fig. 22) which may be manually set to actuate a stationary valve 838 which comprises a valve piston or plunger 839 carrying a cam roll 840 which engages the cam 832 as the corresponding dip head approaches the dipping and gathering zone.

The valve piston 839 is thereby moved to the left from the Fig. 22 position, against the pressure of a coil spring 841. The valve is provided with an intake port 842 communicating through a pipe 842a with the pressure line of the blank crack pump 122. A valve 843 is provided in the pressure line 167 which supplies pressure for actuating the dip head motor 108, said valve being provided with a piston 844 normally held in its up position by a spring 845 to permit an unrestricted flow of oil through the pipe 167 for operating and controlling the dip head motor. A port 846 at one end of the valve 843 communicates through a pipe 848 with a port 847 in the valve 838, the port 847 being normally open to the drain line 849.

When a dip head approaches the gathering area and the cam 832 operates the valve piston 839, as above described, communication is established between the ports 842 and 847 so that pressure is transmitted through the line 842a, 848 to the valve 843 and shifts the piston 844 downward to close the line 167. It will be understood that at this time the piston 168 of the dip motor is in its lowered position and the head out of dip. When the line 167 is closed by the valve piston 844, the fluid above the piston 168 in the motor 108 is locked and operates positively to hold the head out of dip. Pressure built up in the lines 166 and 167 while the latter is closed by the valve 844, is released through the relief valves 850 into the supply tank. Each dip head remains out of dip so long as the corresponding cam 832 remains in operative position. Each cam 832 may be moved into or out of operative position as desired at any time without interrupting the normal operation of the machine.

Modifications may be resorted to within the spirit and scope of our invention as defined in the appended claims.

We claim:

1. A machine for forming glass articles comprising a rotary mold carriage, a series of molds thereon, a hydraulic motor having a driving connection with the mold carriage and operative to continuously rotate the carriage, a hydraulic pump, pipe connections for supplying a driving fluid from the pump to the motor for driving the latter and thereby rotating the mold carriage to bring the molds in succession to a charge receiving position, and automatic means for periodically reducing the fluid output of the pump in timed relation to the movements of the molds and causing the carriage to run at a reduced speed while each mold is in a charge receiving position.

2. A machine for forming glass articles comprising a rotary mold carriage, a series of molds thereon, a hydraulic motor having a driving connection with the mold carriage and operative to continuously rotate the carriage, a hydraulic pump, pipe connections for supplying a driving fluid from the pump to the motor for driving the latter and thereby rotating the mold carriage to bring the molds in succession to a charge receiving position, automatic means for periodically reducing the fluid output of the pump in timed relation to the movements of the molds and causing the carriage to run at a reduced speed while each mold is in a charge receiving position, said means comprising a cam having a driving connection with the mold carriage, means actuated by said cam for adjusting the driving pump to vary its fluid output, and manual adjusting means for adjustably varying the extent to which the output of the driving pump is varied.

3. A machine for forming hollow glass articles comprising a hollow vertical center column, a mold carriage mounted to rotate about the axis of said column, dip heads movable up and down on the carriage, suction gathering molds on said dip heads, a hydraulic piston motor within said column, a stationary track extending circumferentially of the mold carriage, cam rolls on and individual to the dip heads arranged to run on said track, a dip lever extending radially of the mold carriage and having a stationary mounting, a connecting rod between the inner end of the dip lever and the motor piston, a connecting element at the outer end of said lever by which an operative connection is effected between the lever and each said cam roll, and means for actuating said motor while connected with each dip head for lowering and lifting the latter to and from a charge gathering position.

4. A machine for forming glass articles comprising a mold carriage, means for rotating the carriage, a dip head on the carriage, a mold on the dip head, a hydraulic piston motor, operating connections between said motor and the dip head for lowering and lifting the latter, a periodically rotatable and reversible hydraulic pump for operating the piston motor, and means for controlling the operation of said pump including mechanism having driving connection with the mold carriage and operating in synchronism with the rotation of the mold carriage for periodically reversing and arresting said pump and thereby intermittently operating the piston motor and causing the latter to lower and lift the dip head periodically in timed relation to the rotation of the mold carriage.

5. A machine for forming hollow glass articles comprising a rotary mold carriage, dip heads movable up and down on the carriage, molds carried by the dip heads, a hydraulic motor for rotating the carriage, a rotary drive pump for driving said motor, a rotary dip pump, a hydraulic motor operated thereby and having operating connections with the dip heads for lifting and lowering them, and mechanism having operating connections with the mold carriage and driven in synchronism with the latter for periodically varying the speed of said drive pump and periodically reversing the dip pump and thereby periodically reducing the speed of the mold carriage and effecting periodic operations of said hydraulic motor for lowering and lifting the dip heads, said mechanism being timed to cause each dip head to be lowered and lifted while the mold carriage is running at a reduced speed.

6. A machine for forming glass articles comprising a mold carriage, molds thereon, means cooperating with the molds for forming glass articles, means for continuously rotating the mold carriage including a hydraulic motor, driving mechanism connecting the motor with the mold carriage for driving the latter, a noncompressible driving fluid, means for circulating it through the motor and thereby driving the motor, and automatic means operatively associated with the mold carriage and automatically brought periodically into activity when the mold carriage reaches a predetermined point in its travel, for periodically varying the fluid flow through the motor and thereby periodically varying the speed of the motor and the speed at which the mold carriage is driven.

7. A machine for forming glass articles comprising a traveling mold carriage, molds thereon arranged to travel in a predetermined closed path, means cooperating with the molds for forming glass articles, a hydraulic motor, driving mechanism connecting the motor with the mold carriage for driving the latter continuously, a hydraulic pump, a noncompressible driving fluid driven by the pump through the motor and operative thereby to drive said motor, an electric motor connected to drive said pump, and automatic means operatively associated with the mold carriage and automatically brought into activity each time the mold carriage reaches a predetermined point in its travel, for periodically varying the supply of the driving fluid from the pump to the hydraulic motor and thereby periodically varying the speed of the hydraulic motor and mold carriage.

8. A machine for forming glass articles comprising a rotatable mold carriage, a mold thereon periodically brought into a charge-receiving position as the carriage reaches a predetermined position during its rotation, a hydraulic motor geared to the mold carriage for rotating it, a noncompressible fluid, means cooperating with said motor to provide a circuit for said fluid, means for driving the fluid through said circuit and thereby driving the motor, and speed controlling means interconnected with the mold carriage and operative automatically to modify the flow of fluid in said circuit and thereby cause the mold carriage to be driven at a reduced speed while the mold is traversing the charge-gathering position.

9. A machine for forming glass articles comprising a mold carriage rotatable about a vertical axis, a plurality of molds thereon brought in succession to a charge-receiving station by the rotation of the mold carriage, a hydraulic motor connected with the carriage to drive the carriage, a noncompressible fluid, means for driving the fluid through the motor and thereby driving the motor, cam mechanism having an operating connection with the mold carriage, and means operative and controlled by the cam mechanism for modifying the flow of fluid through the motor and thereby effecting a periodic reduction in the speed of the mold carriage while each mold is traversing the charge-receiving station.

10. A machine for forming glass articles comprising a mold carriage mounted for continuous rotation, molds thereon brought in succession to a charge-receiving position by the rotation of the carriage, means for introducing a charge of glass into each mold while in said position, a hydraulic motor having a driving connection with the mold carriage and operable therethrough to rotate the carriage continuously, a drive pump, means for driving the latter, a noncompressible driving fluid, means for transmitting said fluid from the pump to the hydraulic motor and thereby driving the latter continuously, and automatic means actuated in synchronism with the movements of the mold carriage and operative to cause a reduced fluid supply from the pump while each mold is traversing the charge-receiving position and thereby causing the hydraulic motor and the mold carriage to run at a reduced speed while each mold is receiving its charge.

11. A machine for forming glass articles comprising a mold carriage mounted for continuous rotation, molds thereon brought in succession to a charge-receiving position by the rotation of the carriage, means for introducing a charge of glass into each mold while in said position, a hydraulic motor having a driving connection with the mold carriage and operable therethrough to rotate the carriage continuously, a drive pump, means for driving the latter, a noncompressible driving fluid, means for transmitting said fluid from the pump to the hydraulic motor and thereby driving the latter continuously, and automatic means actuated in synchronism with the movements of the mold carriage and operative to cause a reduced fluid supply from the pump while each mold is traversing the charge-receiving position and thereby causing the hydraulic motor and the mold carriage to run at a reduced speed while each mold is receiving its charge, said automatic means comprising a cam, driving connections between the cam and the hydraulic motor, and means actuated by the cam for controlling the fluid output of the drive pump.

12. A machine for forming glass articles comprising a mold carriage, an annular series of units thereon, each comprising a blank mold, driving means for continuously rotating the mold carriage and thereby causing each said mold to continuously travel in a circular path, means for introducing a charge of glass into each mold while traversing a charge-receiving zone, and automatic means for periodically slowing down the carriage and thereby causing each mold to travel at a comparatively slow speed while traversing said receiving zone.

13. A machine for forming glass articles comprising a mold carriage, an annular series of units thereon, each comprising a blank mold, driving means for continuously rotating the mold carriage and thereby causing each said mold to continuously travel in a circular path, means for introducing a charge of glass into each mold while traversing a charge-receiving zone, and automatic means for periodically slowing down the carriage, said driving means including a continuously operating hydraulic motor and means for periodically reducing the speed of the motor and mold carriage and thereby causing the carriage with the molds thereon to travel at a reduced speed while each mold is traversing the charge-receiving zone alternating with an accelerated speed.

14. A machine for forming glass articles comprising a mold carriage, an annular series of units thereon, each comprising a blank mold, driving means for continuously rotating the mold carriage and thereby causing each said mold to continuously travel in a circular path, means for introducing a charge of glass into each mold while traversing a charge-receiving zone, and automatic means for periodically slowing down the carriage, said carriage driving means including a hydraulic motor having driving connections with the mold carriage, a cam, gearing interconnecting said cam and mold carriage for causing the cam to be driven at a speed proportionate to that of the mold carriage, and means actuated by said cam for controlling the speed of the hydraulic motor and causing a speed reduction during each period that a mold is traversing said zone.

15. A machine for forming glass articles comprising a mold carriage, an annular series of units thereon, each comprising a blank mold, driving means for continuously rotating the mold carriage and thereby causing each said mold to continuously travel in a circular path, means for introducing a charge of glass into each mold while traversing a charge-receiving zone, and automatic means for periodically slowing down the carriage and thereby causing each mold to travel at a comparatively slow speed while traversing said receiving zone, said carriage driving means including a constant speed electric motor, a hydraulic pump driven thereby, a hydraulic motor driven by the pump, driving connections between the hydraulic motor and the carriage, and means for periodically reducing the speed of the mold carriage and causing it to travel at a comparatively slow speed while each mold is traversing said zone alternating with a comparatively high speed.

16. A machine for molding glass articles comprising a mold carriage, a suction gathering mold thereon, a hydraulic motor, driving connections between the motor and mold carriage for continuously rotating the mold carriage and thereby causing the mold to periodically traverse a supply body of molten glass, means for applying suction within the mold while traversing said supply body and thereby gathering a charge of glass into the mold, means for forcing a driving fluid through said hydraulic motor for driving the latter, and automatic means for periodically reducing the fluid supply and thereby slowing down the movement of the mold carriage during each said gathering operation.

17. A machine for molding glass articles comprising a rotatable mold carriage, a blank mold and a finishing mold mounted to rotate with the carriage, a hydraulic motor geared to the mold carriage and operable to rotate the latter continuously, a second hydraulic motor, operating means between the latter and the blank mold for periodically moving the blank mold relative to the carriage to and from a charge-receiving position on the carriage, a third hydraulic motor having operating connections with the finishing mold and operable to periodically move the latter to and from a parison transfer position to permit the transfer of parisons from the blank mold to the finishing mold, and a control mechanism interconnected with the mold carriage and driven in synchronism therewith, said control mechanism including means for periodically changing the speed of each of said hydraulic motors.

18. A machine for molding glass articles comprising a rotatable mold carriage, a blank mold and a finishing mold mounted to rotate with the carriage, a hydraulic motor geared to the mold carriage and operable to rotate the latter continuously, a second hydraulic motor, operating means between the latter and the blank mold for periodically moving the blank mold relative to the carriage to and from a charge-receiving position on the carriage, a third hydraulic motor having operating connections with the finishing mold and operable to periodically move the latter to and from a parison transfer position to permit the transfer of parisons from the blank mold to the finishing mold, and a control mechanism interconnected with the mold carriage and driven in synchronism therewith, said control mechanism including speed changing devices individual to said hydraulic motors and a manual adjusting device operable to simultaneously adjust all of said speed changing devices and thereby effect a simultaneous and synchronized adjustment of the speed of all of said hydraulic motors.

JOHN B. HAWLEY, Jr.
IRVING NELSON.
DANIEL F. HALLBERG.
EARL CANNON.